US012034229B2

(12) United States Patent
Lee

(10) Patent No.: US 12,034,229 B2
(45) Date of Patent: Jul. 9, 2024

(54) ELECTRONIC DEVICE

(71) Applicant: Samsung Display Co., Ltd., Yongin-Si (KR)

(72) Inventor: Hyun Jae Lee, Seongnam-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 118 days.

(21) Appl. No.: 17/899,376

(22) Filed: Aug. 30, 2022

(65) Prior Publication Data

US 2023/0208033 A1 Jun. 29, 2023

(30) Foreign Application Priority Data

Dec. 23, 2021 (KR) ........................ 10-2021-0186180

(51) Int. Cl.
*H01Q 5/50* (2015.01)
*H01Q 1/24* (2006.01)
*H01Q 1/36* (2006.01)

(52) U.S. Cl.
CPC ............... *H01Q 5/50* (2015.01); *H01Q 1/243* (2013.01); *H01Q 1/36* (2013.01)

(58) Field of Classification Search
CPC ............. H01Q 5/50; H01Q 1/243; H01Q 1/36
See application file for complete search history.

(56) References Cited

U.S. PATENT DOCUMENTS

| | | | |
|---|---|---|---|
| 10,990,234 | B2 | 4/2021 | Kim et al. |
| 2017/0139520 | A1 | 5/2017 | Yeh et al. |
| 2021/0132714 | A1 | 5/2021 | Dan et al. |

FOREIGN PATENT DOCUMENTS

| | | | |
|---|---|---|---|
| KR | 10-2018-0114771 | A | 10/2018 |
| KR | 10-2009382 | B1 | 8/2019 |
| KR | 10-2020-0143628 | A | 12/2020 |

*Primary Examiner* — Graham P Smith
(74) *Attorney, Agent, or Firm* — Innovation Counsel LLP

(57) ABSTRACT

Disclosed is an electronic device that includes a plurality of first sensing electrodes arranged in a first direction, a plurality of second sensing electrodes arranged in a second direction crossing the first direction, and an antenna pattern including a first sub-antenna pattern surrounded by one of the plurality of first sensing electrodes and a second sub-antenna pattern electrically connected to the first sub-antenna pattern and disposed between the one of the plurality of first sensing electrodes and one of the plurality of second sensing electrodes.

24 Claims, 15 Drawing Sheets

ELECTRONIC DEVICE

CROSS-REFERENCE TO RELATED APPLICATIONS

This application claims priority under 35 U.S.C. § 119 to Korean Patent Application No. 10-2021-0186180 filed on Dec. 23, 2021, in the Korean Intellectual Property Office, the disclosures of which are incorporated by reference herein in their entireties.

BACKGROUND

Embodiments of the present disclosure described herein relate to an electronic device capable of communication.

An electronic device that supports wireless communication may include an antenna. The antenna may transmit and receive signals in a specific frequency range by using, as a radiator, a metallic material that is disposed inside the electronic device or forms the exterior of the electronic device. The electronic device may include antennas for wireless communication such as a cellular network, Wi-Fi, or Bluetooth.

SUMMARY

Embodiments of the present disclosure provide an electronic device capable of communication.

According to an embodiment, an electronic device includes a plurality of first sensing electrodes arranged in a first direction, a plurality of second sensing electrodes arranged in a second direction crossing the first direction, and an antenna pattern including a first sub-antenna pattern surrounded by one of the plurality of first sensing electrodes and a second sub-antenna pattern electrically connected to the first sub-antenna pattern and disposed between the one of the plurality of first sensing electrodes and one of the plurality of second sensing electrodes.

The antenna pattern may further include an antenna bridge pattern connecting the first sub-antenna pattern and the second sub-antenna pattern, and the antenna bridge pattern may overlap the one of the plurality of first sensing electrodes in a plan view.

The first sub-antenna pattern, the second sub-antenna pattern, and the antenna bridge pattern may be disposed on a same layer and may be connected together to form an integrated shape.

The one of the plurality of first sensing electrodes may include a pattern portion that surrounds the first sub-antenna pattern, and the pattern portion may include a first partial pattern disposed on the same layer as the first sub-antenna pattern, the second sub-antenna pattern, and the antenna bridge pattern and a second partial pattern that is disposed on a different layer from the first partial pattern and that crosses the antenna bridge pattern.

The antenna bridge pattern may include a plurality of antenna bridge patterns, and the second partial pattern may include a plurality of second partial patterns.

The antenna bridge pattern may be disposed on a first layer, and the first sub-antenna pattern and the second sub-antenna pattern may be disposed on a second layer disposed over the first layer.

An insulating layer may be disposed between the antenna bridge pattern and the one of the plurality of first sensing electrodes.

An insulating pattern having an island shape may be disposed between the antenna bridge pattern and the one of the plurality of first sensing electrodes.

The antenna pattern may further include a third sub-antenna pattern surrounded by the one of the plurality of second sensing electrodes, and may be electrically connected to the first sub-antenna pattern and the second sub-antenna pattern.

The second sub-antenna pattern may be connected to the first sub-antenna pattern through a first antenna bridge pattern that overlaps the one of the plurality of first sensing electrodes, and the second sub-antenna pattern may be connected to the third sub-antenna pattern through a second antenna bridge pattern that overlaps the one of the plurality of second sensing electrodes.

The electronic device may further include an antenna feed line electrically connected to the antenna pattern and an antenna pad connected to the antenna feed line, and the antenna pattern may further include a connecting antenna pattern disposed between the one of the plurality of first sensing electrodes and the antenna feed line and connected to the antenna feed line.

The electronic device may further include a first dummy pattern surrounded by the one of the plurality of first sensing electrodes and spaced apart from the first sub-antenna pattern, and the first dummy pattern may have substantially the same shape as the first sub-antenna pattern.

The one of the plurality of first sensing electrodes may include a plurality of pattern portions arranged to be spaced apart from each other in the second direction and a plurality of connecting portions, each of which connects two pattern portions adjacent to each other. The first sub-antenna pattern may be surrounded by one of the plurality of pattern portions, and the first dummy pattern may be surrounded by another one of the plurality of pattern portions.

The electronic device may further include a second dummy pattern disposed between another first sensing electrode spaced apart from the one of the plurality of first sensing electrodes in the first direction and the one of the plurality of second sensing electrodes, and the second dummy pattern may have substantially the same shape as the second sub-antenna pattern.

The second sub-antenna pattern may be disposed between two first sensing electrodes adjacent to each other and between two second sensing electrodes adjacent to each other, and the second dummy pattern may be disposed between two other first sensing electrodes adjacent to each other and between the two second sensing electrodes.

The first sub-antenna pattern and the second sub-antenna pattern may have different shapes.

According to an embodiment, an electronic device includes a plurality of sensing patterns arranged in a first direction and a second direction crossing the first direction, a first sub-antenna pattern at least partially surrounded by a first sensing pattern among the plurality of sensing patterns, an antenna feed line electrically connected to the first sub-antenna pattern and the second sub-antenna pattern, and an antenna pad connected to the antenna feed line.

The first sensing pattern may have a smaller area than a second sensing pattern spaced apart from the first sub-antenna pattern.

The first sub-antenna pattern may be disposed in an area correspond to a portion of the first sensing area in which the first sensing pattern is removed.

The electronic device may further include a third sub-antenna pattern connected to the second sub-antenna pattern and at least partially surrounded by a third sensing pattern spaced apart from the first sub-antenna pattern.

The first sub-antenna pattern may be completely surrounded by the first sensing pattern and may be spaced apart from the second sub-antenna pattern with the first sensing pattern therebetween.

The electronic device may further include an antenna bridge pattern connected to the first sub-antenna pattern and the second sub-antenna pattern, and the antenna bridge pattern may overlap the first sensing pattern w % ben viewed on a plane.

The first sub-antenna pattern, the second sub-antenna pattern, and the antenna bridge pattern may be disposed on a same layer and may be connected together to form an integrated shape.

The first sensing pattern may include a first partial pattern disposed on a same layer as the first sub-antenna pattern, the second sub-antenna pattern, and the antenna bridge pattern and a second partial pattern that is disposed on a different layer from the first partial pattern and that crosses the antenna bridge pattern.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
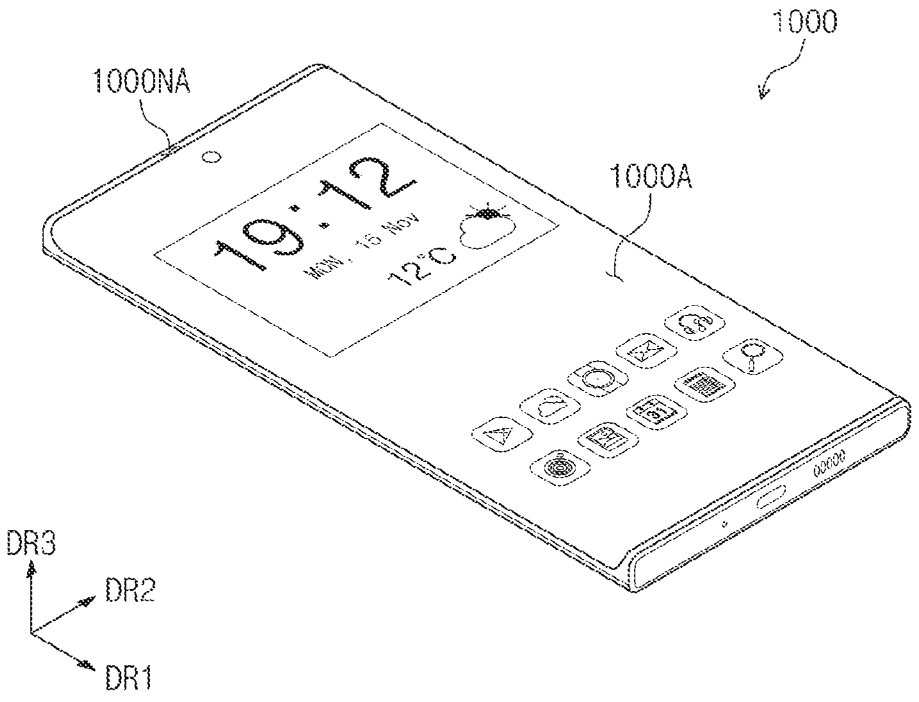
FIG. 1 is a perspective view of an electronic device according to an embodiment of the present disclosure.

In this specification, w % ben it is mentioned that a component (or, an area, a layer, a part, etc.) is referred to as being “on”, “connected to” or “coupled to” another component, this means that the component may be directly on, connected to, or coupled to the other component or a third component may be present therebetween.

Identical reference numerals refer to identical components. Additionally, in the drawings, the thicknesses, proportions, and dimensions of components are exaggerated for effective description. As used herein, the term “and/or” includes all of one or more combinations defined by related components.

Terms such as first, second, and the like may be used to describe various components, but the components should not be limited by the terms. The terms may be used only for distinguishing one component from other components. For example, without departing the scope of the present disclosure, a first component may be referred to as a second component, and similarly, the second component may also be referred to as the first component. The terms of a singular form may include plural forms unless otherwise specified.

In addition, terms such as “below”, “under”, “above”, and “over” are used to describe a relationship of components illustrated in the drawings. The terms are relative concepts and are described based on directions illustrated in the drawing.

It should be understood that terms such as “comprise”, “include”, and “have”, when used herein, specify the presence of stated features, numbers, steps, operations, components, parts, or combinations thereof, but do not preclude the presence or addition of one or more other features, numbers, steps, operations, components, parts, or combinations thereof.

Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described with reference to the accompanying drawings.

FIG. 1 is a perspective view of an electronic device 1000 according to an embodiment of the present disclosure.

Referring to FIG. 1, the display device 1000 may be a device activated in response to an electrical signal. For example, the electronic device 1000 may be a mobile phone, a tablet computer, a car navigation system, a game machine, or a wearable device, but the display device 1000 is not limited thereto. In FIG. 1, the electronic device 1000 is illustrated as a mobile phone.

A display area 1000A and a non-display area 1000NA may be included in the electronic device 1000. The non-display area 1000NA may be an area around the display area 1000A. The electronic device 1000 may display an image through the display area 1000A.

The thickness direction of the electronic device 1000 may be parallel to a third direction DR3 crossing a first direction DR1 and a second direction DR2. Accordingly, front surfaces (or, upper surfaces) and rear surfaces (or, lower surfaces) of members constituting the electronic device 1000 may be defined based on the third direction DR3. As used herein, the expression "in a plan view" may mean that it is viewed in the third direction DR3 of the electronic device 1000.

Figure 2:
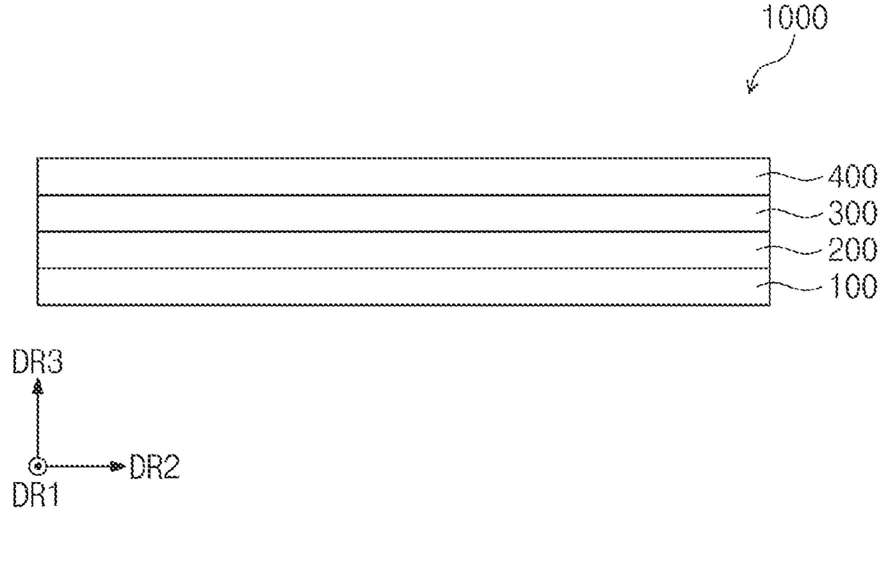
FIG. 2 is a schematic sectional view of the electronic device according to an embodiment of the present disclosure.

FIG. 2 is a schematic sectional view of the electronic device 1000 according to an embodiment of the present disclosure.

Referring to FIG. 2, the electronic device 1000 may include a display layer 100, a sensor layer 200, an optical film 300, and a window 400. In an embodiment of the present disclosure, some of the aforementioned components may be omitted, or other components may be additionally added. An adhesive layer may be disposed between the members as needed. The adhesive layer may be an optically clear adhesive (OCA) member or a pressure sensitive adhesive (PSA) film, but the adhesive layer is not particularly limited thereto. Adhesive layers to be described below may also contain the same material or a conventional adhesive.

The display layer 100 may be a component that substantially generates an image. The display layer 100 may be an emissive display layer. For example, the display layer 100 may be an organic light emitting display layer, an inorganic light emitting display layer, an organic-inorganic light emitting display layer, a quantum dot display layer, a micro-LED display layer, or a nano-LED display layer.

The sensor layer 200 may be disposed on the display layer 100. The sensor layer 200 may sense an external input applied from outside. The external input may be a user input. The user input may include various types of external inputs such as a part of a user's body, light, heat, a pen, or pressure.

The sensor layer 200 may be formed on the display layer 100 through a continuous process. In this case, the sensor layer 200 may be expressed as being directly disposed on the display layer 100. When the sensor layer 200 is directly disposed on the display layer 100, it may mean that a third component is not disposed between the sensor layer 200 and the display layer 100. That is, a separate adhesive member may not be disposed between the sensor layer 200 and the display layer 100. Alternatively, the sensor layer 200 may be coupled with the display laver 100 through an adhesive member. The adhesive member may include a conventional adhesive or sticky substance.

The optical film 300 may lower the reflectivity of light incident from the outside. The optical film 300 may include a phase retarder and/or a polarizer. The optical film 300 may be a polarizer film. The optical film 300 may be attached to the sensor layer 200 through an adhesive layer.

The optical film 300 may include color filers. In this case, the optical film 300 may be directly formed on the sensor layer 200. The color filters may have a predetermined arrangement. The arrangement of the color filters may be determined in consideration of light emission colors of pixels included in the display layer 100. In addition, the optical film 300 may further include a black matrix disposed adjacent to the color filters.

The optical film 300 may include a destructive interference structure. For example, the destructive interference structure may include a first reflective layer and a second reflective layer disposed on different layers. First reflected light and second reflected light reflected from the first reflective layer and the second reflective layer, respectively, may destructively interfere with each other, and thus the reflectivity of external light may be decreased. Alternatively, the optical film 300 may be omitted.

The window 400 may be disposed on the optical film 300. The window 400 may contain an optically transparent insulating material. For example, the window 400 may contain glass or plastic. The window 400 may have a multi-layer structure or a single-layer structure. For example, the window 400 may include a plurality of plastic films coupled through an adhesive, or may include a glass substrate and a plastic film coupled through an adhesive.

Figure 3:
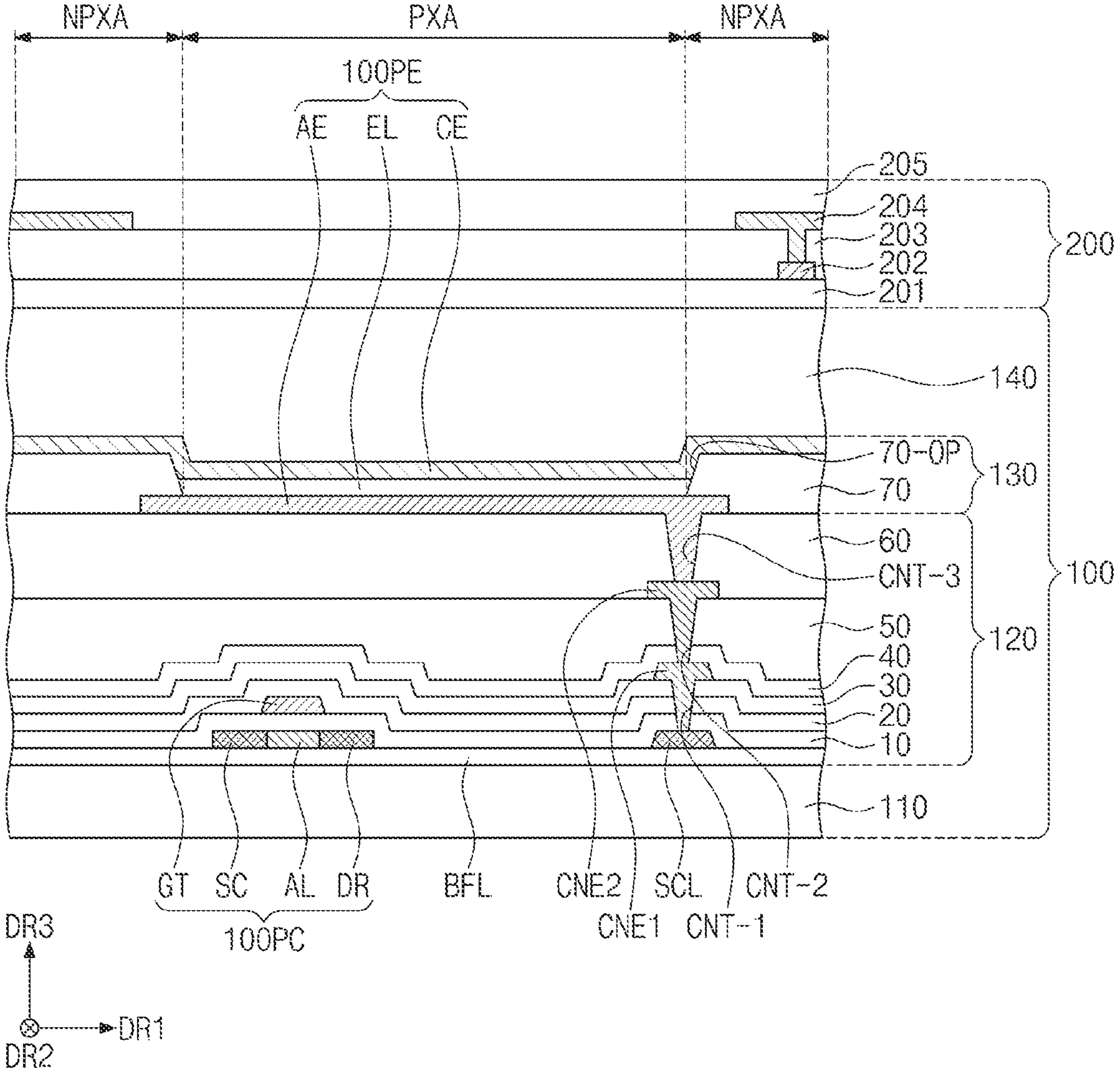
FIG. 3 is a sectional view illustrating some components of the electronic device according to an embodiment of the present disclosure.

FIG. 3 is a sectional view illustrating some components of the electronic device 1000 (refer to FIG. 1) according to an embodiment of the present disclosure.

In FIG. 3, the display layer 100 and the sensor layer 200 are illustrated.

The display layer 100 may include a base layer 110, a circuit layer 120, a light emitting element layer 130, and an encapsulation layer 140.

The base layer 110 may have a base surface on which the circuit layer 120 is disposed. The base layer 110 may be a rigid substrate or a flexible substrate that can be bent, folded, or rolled. The base layer 110 may be a glass substrate, a metal substrate, or a polymer substrate. However, without being limited thereto, the base layer 110 may be an inorganic layer, an organic layer, or a composite layer.

The circuit layer 120 may be disposed on the base layer 110. The circuit layer 120 may include an insulating laver, a semiconductor pattern, a conductive pattern, and a signal line. The insulating layer, a semiconductor layer, and a conductive layer may be formed on the base layer 110 by a method such as coating or deposition and may be patterned by performing a photolithography process a plurality of times to form the semiconductor pattern, the conductive pattern, and the signal line included in the circuit layer 120.

A buffer layer BFL may be disposed on the base layer 110. The buffer layer BFL may prevent diffusion of metal atoms or impurities from the base layer 110 to the semiconductor pattern. Furthermore, the buffer layer BFL may adjust heat conductivity during a crystallization process for forming the semiconductor pattern, thereby enabling the semiconductor pattern to be uniformly formed.

The semiconductor pattern may be disposed on the buffer layer BFL. The semiconductor pattern may include a silicon semiconductor. For example, the silicon semiconductor may contain amorphous silicon or polycrystalline silicon. For example, the semiconductor pattern may contain low-temperature poly silicon. However, the present disclosure is not limited thereto. The semiconductor pattern may include an oxide semiconductor.

FIG. 3 illustrates a portion of the semiconductor pattern disposed only on the buffer layer BFL, but the semiconductor pattern may be additionally disposed on another layer other than the buffer layer BFL. The semiconductor pattern may be arranged across pixels according to a specific rule. The semiconductor pattern may have different electrical properties depending on whether the semiconductor pattern is doped or not. The semiconductor pattern may include a first area having a high conductivity and a second area having a low conductivity. The first area may be doped with an N-type dopant or a P-type dopant. A P-type transistor may include a doped area doped with a P-type dopant and an N-type transistor may include a doped area doped with an N-type dopant. The second area may be an un-doped area, or may be an area more lightly doped than the first area.

The first area may have a higher conductivity than the second area and may substantially serve as an electrode or a signal line. The second area may substantially correspond to an active area (or, a channel) of a transistor. In other words, one portion of the semiconductor pattern may be an active area of a transistor, another portion may be a source or a drain of the transistor, and another portion may be a connecting electrode or a connecting signal line.

Each of the pixels may have an equivalent circuit including seven transistors, one capacitor, and a light emitting element, and the equivalent circuit of the pixel may be modified in various forms. In FIG. 3, one transistor 100PC and one light emitting element 100PE included in the pixel are illustrated.

The semiconductor pattern may include a source area SC, an active area AL, and a drain area DR of the transistor 100PC. The source area SC and the drain area DR may extend from the active area AL in opposite directions. The semiconductor pattern may further include a portion of a connecting signal line SCL as illustrated in FIG. 3. Although not separately illustrated, the connecting signal line SCL may be connected to the drain area DR of the transistor 100PC in a plan view.

A first insulating layer 10 may be disposed on the buffer layer BFL. The first insulating layer 10 may commonly be disposed in areas corresponding to a plurality of pixels and may cover the semiconductor pattern. The first insulating layer 10 may be an inorganic layer and/or an organic layer and may have a single-layer structure or a multi-layer structure. The first insulating layer 10 may contain at least one of aluminum oxide, titanium oxide, silicon oxide, silicon nitride, silicon oxy-nitride, zirconium oxide, or hafnium oxide. In this embodiment, the first insulating layer 10 may be a single layer of silicon oxide. Not only the first insulating layer 10 but also insulating layers of the circuit layer 120 to be described below may be inorganic layers and/or organic layers and may have a single-layer structure or a multi-layer structure. The inorganic layers may contain at least one of the aforementioned materials, but are not limited thereto.

A gate GT of the transistor 100PC is disposed on the first insulating layer 10. The gate GT may be a portion of a metal pattern. The gate GT overlaps the active area AL. The gate GT may function as a self-aligned mask in a process of doping the semiconductor pattern.

A second insulating layer 20 may be disposed on the first insulating layer 10 to cover the gate GT. The second insulating layer 20 may commonly be disposed in the areas corresponding to the plurality of pixels. The second insulating layer 20 may be an inorganic layer and/or an organic layer and may have a single-layer structure or a multi-layer structure. In this embodiment, the second insulating layer 20 may be a single layer of silicon oxide or silicon nitride.

A third insulating layer 30 may be disposed on the second insulating layer 20. In this embodiment, the third insulating layer 30 may be a single layer of silicon oxide or silicon nitride.

A first connecting electrode CNE1 may be disposed on the third insulating layer 30. The first connecting electrode CNE1 may be connected to the connecting signal line SCL through a contact hole CNT-1 formed through the first, second, and third insulating layers 10, 20, and 30.

A fourth insulating layer 40 may be disposed on the third insulating layer 30 to cover the first connecting electrode CNE1. The fourth insulating layer 40 may be a signal layer of silicon oxide. A fifth insulating layer 50 may be disposed on the fourth insulating layer 40. The fifth insulating layer 50 may be an organic layer.

A second connecting electrode CNE2 may be disposed on the fifth insulating layer 50. The second connecting electrode CNE2 may be connected to the first connecting electrode CNE1 through a contact hole CNT-2 formed through the fourth insulating layer 40 and the fifth insulating layer 50.

A sixth insulating layer 60 may be disposed on the fifth insulating layer 50 to cover the second connecting electrode CNE2. The sixth insulating layer 60 may be an organic layer.

The light emitting element layer 130 may be disposed on the circuit layer 120. The light emitting element layer 130 may include the light emitting element 100PE. For example, the light emitting element layer 130 may include an organic light emitting material, an inorganic light emitting material, an organic-inorganic light emitting material, a quantum dot, a quantum rod, a micro LED, or a nano LED. The light emitting element 100PE may include a first electrode AE, an emissive layer EL, and a second electrode CE.

The first electrode AE may be disposed on the sixth insulating layer 60. The first electrode AE may be connected to the second connecting electrode CNE2 through a contact hole CNT-3 formed in the sixth insulating layer 60.

A pixel defining film 70 may be disposed on the sixth insulating layer 60 to cover a portion of the first electrode AE. An opening 70-OP is defined in the pixel defining film 70. The opening 70-OP of the pixel defining film 70 exposes at least a portion of the first electrode AE.

A display area 100A (refer to FIG. 4) may include an emissive area PXA and a non-emissive area NPXA disposed adjacent to the emissive area PXA. The non-emissive area NPXA may surround the emissive area PXA. In this embodiment, the emissive area PXA is defined to correspond to a partial area of the first electrode AE exposed through the opening 70-OP.

The emissive layer EL may be disposed on the first electrode AE. The emissive layer EL may be disposed in an area corresponding to the opening 70-OP. That is, the emissive layer EL may be separately formed for each of the pixels. When the emissive layer EL is separately formed for each of the pixels, the emissive layers EL may each emit at least one of blue light, red light, or green light. However, without being limited thereto, the emissive layer EL may be commonly disposed through the plurality of pixels. In this case, the emissive layer EL may provide blue light or white light.

The second electrode CE may be disposed on the emissive layer EL. The second electrode CE may have an integrated shape and may be commonly disposed through the plurality of pixels.

Although not illustrated, a hole control layer may be disposed between the first electrode AE and the emissive layer EL. The hole control layer may be commonly disposed in the emissive area PXA and the non-emissive area NPXA. The hole control layer may include a hole transporting layer and may further include a hole injection layer. An electron control layer may be disposed between the emissive layer EL and the second electrode CE. The electron control layer may include an electron transporting layer and may further include an electron injection layer. The hole control layer and the electron control layer may be commonly formed through the plurality of pixels by using an open mask.

The encapsulation layer 140 may be disposed on the light emitting element layer 130. The encapsulation layer 140 may include an inorganic layer, an organic layer, and an inorganic layer sequentially stacked one above another. However, layers constituting the encapsulation layer 140 are not limited thereto. The inorganic layers may protect the light emitting element layer 130 from moisture and oxygen, and the organic layer may protect the light emitting element layer 130 from foreign matter such as dust particles.

The sensor layer 200 may include a base layer 201, a first conductive layer 202, a sensing insulation layer 203, a second conductive layer 204, and a cover insulation layer 205.

The base layer 201 may be an inorganic layer containing at least one of silicon nitride, silicon oxy-nitride, or silicon oxide. Alternatively, the base layer 201 may be an organic layer containing an epoxy resin, an acrylic resin, or a polyimide-based resin. The base layer 201 may have a single-layer structure, or may have a multi-layer structure stacked in the third direction DR3. The base layer 201 may be referred to as the sensor base layer.

Each of the first conductive layer 202 and the second conductive layer 204 may have a single-layer structure, or may have a multi-layer structure stacked in the third direction DR3.

The conductive layer having the single-layer structure may include a metal layer or a transparent conductive layer. The metal layer may contain molybdenum, silver, titanium, copper, aluminum, or an alloy thereof. The transparent conductive layer may contain transparent conductive oxide such as indium tin oxide (ITO), indium zinc oxide (IZO), zinc oxide (ZnO), or indium zinc tin oxide (IZTO). In addition, the transparent conductive layer may contain a conductive polymer such as PEDOT, a metal nano wire, or graphene.

The conductive layer having the multi-layer structure may include metal layers. The meal layers may have, for example, a three-layer structure of titanium/aluminum/titanium. The conductive layer having the multi-layer structure may include at least one metal layer and at least one transparent conductive layer.

At least one of the sensing insulation layer 203 or the cover insulation layer 205 may include an inorganic film. The inorganic film may contain at least one of aluminum oxide, titanium oxide, silicon oxide, silicon nitride, silicon oxy-nitride, zirconium oxide, or hafnium oxide.

At least one of the sensing insulation layer 203 or the cover insulation layer 205 may include an organic film. The organic film may contain at least one of an acrylate-based resin, a methacrylate-based resin, a polyisoprene-based resin, a vinyl-based resin, an epoxy-based resin, a urethane-based resin, a cellulose-based resin, a siloxane-based resin, a polyimide-based resin, a polyamide-based resin, or a perylene-based resin.

Figure 4:
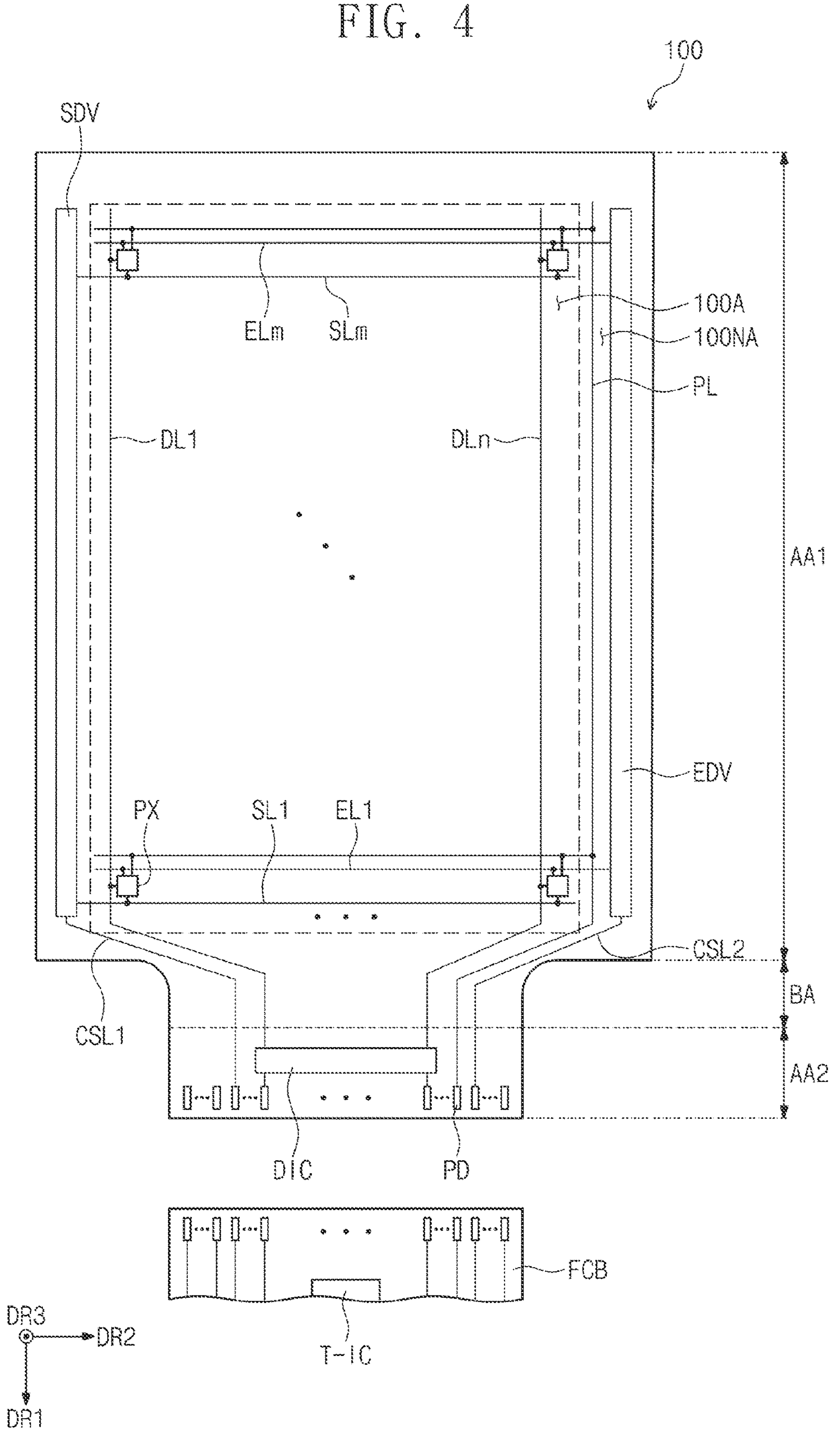
FIG. 4 is a plan view of a display layer according to an embodiment of the present disclosure.

FIG. 4 is a plan view of the display layer 100 according to an embodiment of the present disclosure.

Referring to FIG. 4, the display layer 100 may include the display area 100A and a non-display area 1000NA around the display area 100A. The display area 100A and the non-display area 100NA may be distinguished from each other depending on whether pixels PX are disposed or not. The pixels PX are disposed in the display area 100A. A scan driver SDV, a data driver, and a light emission driver EDV may be disposed in the non-display area 100NA. The data driver may be a driver IC DIC.

The display layer 100 may include a first panel area AA1, a bending area BA, and a second panel area AA2 defined along the first direction DR1. The second panel area AA2 and the bending area BA may be partial areas of the non-display area 100NA. The bending area BA is disposed between the first panel area AA1 and the second panel area AA2.

The width of the bending area BA and the width (or, length) of the second panel area AA2 that are disposed parallel to the second direction DR2 may be smaller than the width (or, length) of the first panel area AA1 that is disposed parallel to the second direction DR2. An area having a smaller length in a direction of a bending axis may be more easily bent.

The display layer 100 may include the plurality of pixels PX, a plurality of scan lines SL1 to SLm, a plurality of data lines DL1 to DLn, a plurality of light emission lines EL1 to ELm, first and second control lines CSL1 and CSL2, a power line PL, and a plurality of pads PD. Here. "m" and "n" are natural numbers. The pixels PX may be connected to the scan lines SL1 to SLm, the data lines DL1 to DLn, and the light emission lines EL1 to ELm.

The scan lines SL1 to SLm may extend in the second direction DR2 and may be electrically connected to the scan driver SDV. The data lines DL1 to DLn may extend in the first direction DR1 and may be electrically connected to the driver IC DIC via the bending area BA. The light emission lines EL1 to ELm may extend in the second direction DR2 and may be electrically connected to the light emission driver EDV.

The power line PL may include a portion extending in the first direction DR1 and a portion extending in the second direction DR2. The portion extending in the first direction DR1 and the portion extending in the second direction DR2 may be disposed on different layers. The portion of the power line PL that extends in the first direction DR1 may extend from the first panel area AA1 to the second panel area AA2 via the bending area BA. The power line PL may provide a first voltage to the pixels PL.

The first control line CSL1 may be connected to the scan driver SDV and may extend toward a lower end of the second panel area AA2 via the bending area BA. The second control line CSL2 may be connected to the light emission driver EDV and may extend toward the lower end of the second panel area AA2 via the bending area BA.

The pads PD may be disposed adjacent to the lower end of the second panel area AA2 in a plan view. The driver IC DIC, the power line PL, the first control line CSL1, and the second control line CSL2 may be electrically connected to the pads PD. A circuit film FCB may be electrically connected to the pads PD through an anisotropic conductive adhesive layer. A sensor driver IC T-IC for driving the sensor layer 200 (refer to FIG. 5) that will be described below may be mounted on the circuit film FCB.

Figure 5:
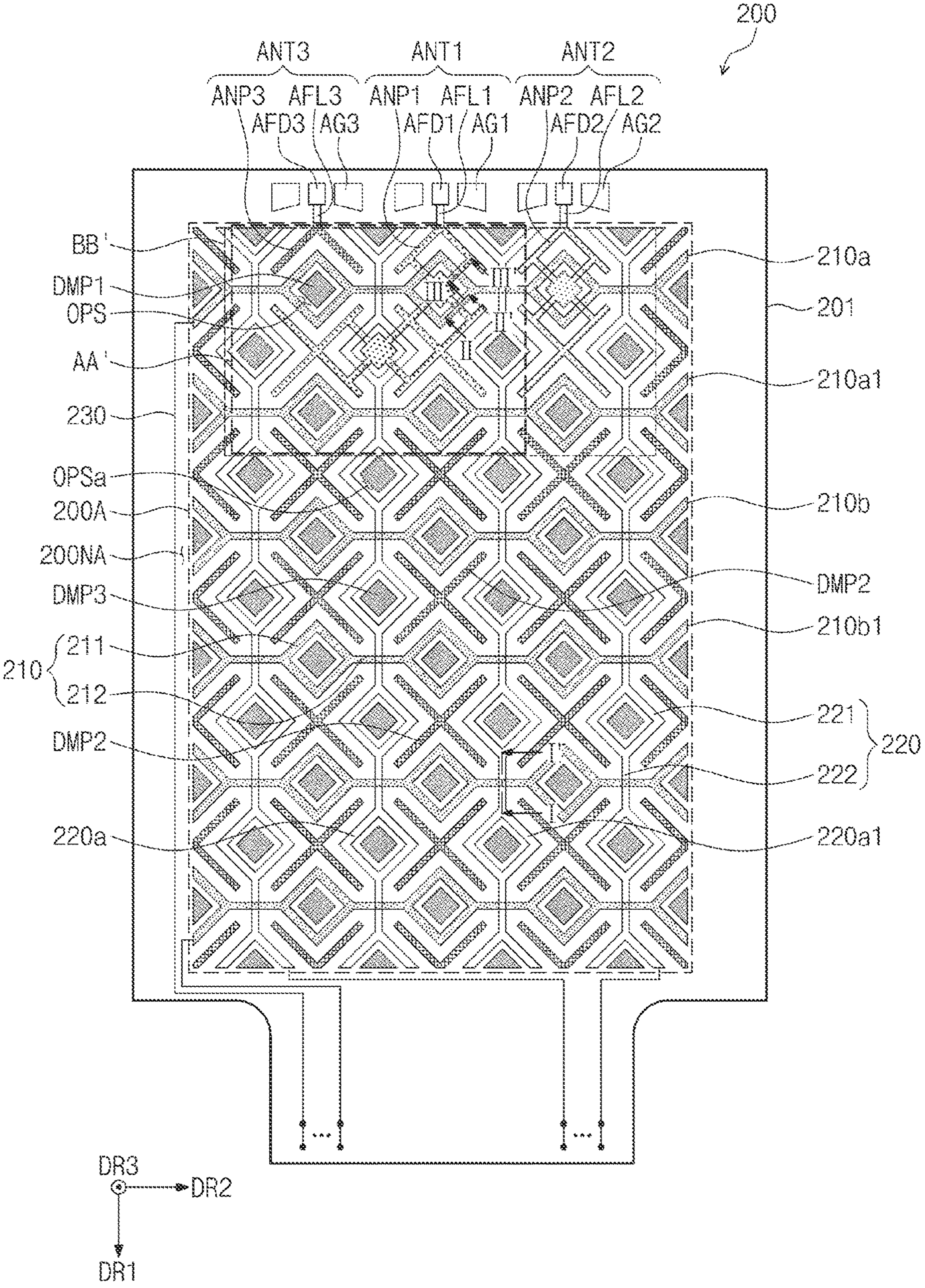
FIG. 5 is a plan view of a sensor layer according to an embodiment of the present disclosure.

FIG. 5 is a plan view of the sensor layer 200 according to an embodiment of the present disclosure.

Referring to FIG. 5, the sensor layer 200 may include first sensing electrodes 210, second sensing electrodes 220, trace lines 230, and one or more antennas ANT1, ANT2, and ANT3.

Although FIG. 5 illustrates an example that the sensor layer 200 includes the first antenna ANT1, the second antenna ANT2, and the third antenna ANT3, the number and shape of antennas included in the sensor layer 200 are not limited thereto. Each of the first to third antennas ANT1, ANT2, and ANT3 may transmit, receive, or transmit/receive a wireless communication signal, for example, a radio frequency signal.

The first antenna ANT1 may include a first antenna pattern ANP1, a first antenna feed line AFL1, and a first antenna pad AFD1. The second antenna ANT2 may include a second antenna pattern ANP2, a second antenna feed line AFL2, and a second antenna pad AFD2. The third antenna ANT3 may include a third antenna pattern ANP3, a third antenna feed line AFL3, and a third antenna pad AFD3. The first to third antenna patterns ANP1, ANP2, and ANP3 may be connected to the first to third antenna feed lines AFL1, AFL2, and AFL3, respectively, and the first to third antenna feed lines AFL1, AFL2, and AFL3 may be connected to the first to third antenna pads AFD1, AFD2, and AFD3, respectively.

The first to third antennas ANT1. ANT2, and ANT3 may further include first to third antenna ground pads AG1, AG2, and AG3, respectively. For example, one first antenna ANT1 may include two first antenna ground pads AG1. The first antenna ground pads AG1 may be spaced apart from each other along the second direction DR2 with one first antenna pad AFD1 disposed therebetween.

The first to third antennas ANT1, ANT2, and ANT3 may have different shapes and may transmit, receive, or transmit/receive signals in different frequency bands. However, this is illustrative, and the first to third antennas ANT1, ANT2, and ANT3 may have the same shape and may transmit, receive, or transmit/receive signals in the same frequency band.

The first sensing electrodes 210 may be arranged in the first direction DR1. Each of the first sensing electrodes 210 may extend along the second direction DR2 crossing the first direction DR1. The second sensing electrodes 220 may be arranged in the second direction DR2. Each of the second sensing electrodes 220 may extend along the first direction DR1. The sensor layer 200 may obtain information about an external input through a change in the mutual capacitance between the first sensing electrodes 210 and the second sensing electrodes 220.

A sensing area 200A and a peripheral area 200NA may be defined in the sensor layer 200. The sensing area 200A may be an area activated in response to an electrical signal. For example, the sensing area 200A may be an area that senses an external input. The peripheral area 200NA may be disposed adjacent to the sensing area 200A and may surround the sensing area 200A.

The first sensing electrodes 210, the second sensing electrodes 220, and the first to third antenna patterns ANP1, ANP2, and ANP3 may be disposed in the sensing area 200A and the trace lines 230, the first to third antenna feed lines AFL1, AFL2, and AFL3, and the first to third antenna pads AFD1. AFD2, and AFD3 may be disposed in the peripheral area 200NA disposed adjacent to the sensing area 200A.

The first sensing electrodes 210, the second sensing electrodes 220, and the first to third antenna patterns ANP1, ANP2, and ANP3 may have a mesh structure in which openings are defined. For example, one opening may overlap at least one emissive area PXA (refer to FIG. 3).

Each of the first sensing electrodes 210 may include a plurality of pattern portions 211 spaced apart from each other in the second direction DR2 and a plurality of connecting portions 212 each of which connects two pattern portions 211 adjacent to each other along the second direction DR2 among the plurality of pattern portions 211. The plurality of pattern portions 211 and the plurality of connecting portions 212 may be connected together to form an integrated shape.

Each of the second sensing electrodes 220 may include a plurality of sensing patterns 221 spaced apart from each other in the first direction DR1 and a plurality of bridge patterns 222 each of which connects two sensing patterns 221 adjacent to each other along the first direction DR1 among the plurality of sensing patterns 221.

The plurality of pattern portions 211 and the plurality of sensing patterns 221 may all be referred to as the sensing patterns. For example, the plurality of pattern portions 211 may be referred to as the first sensing patterns and the plurality of sensing patterns 221 may be referred to as the second sensing patterns.

Figure 6:
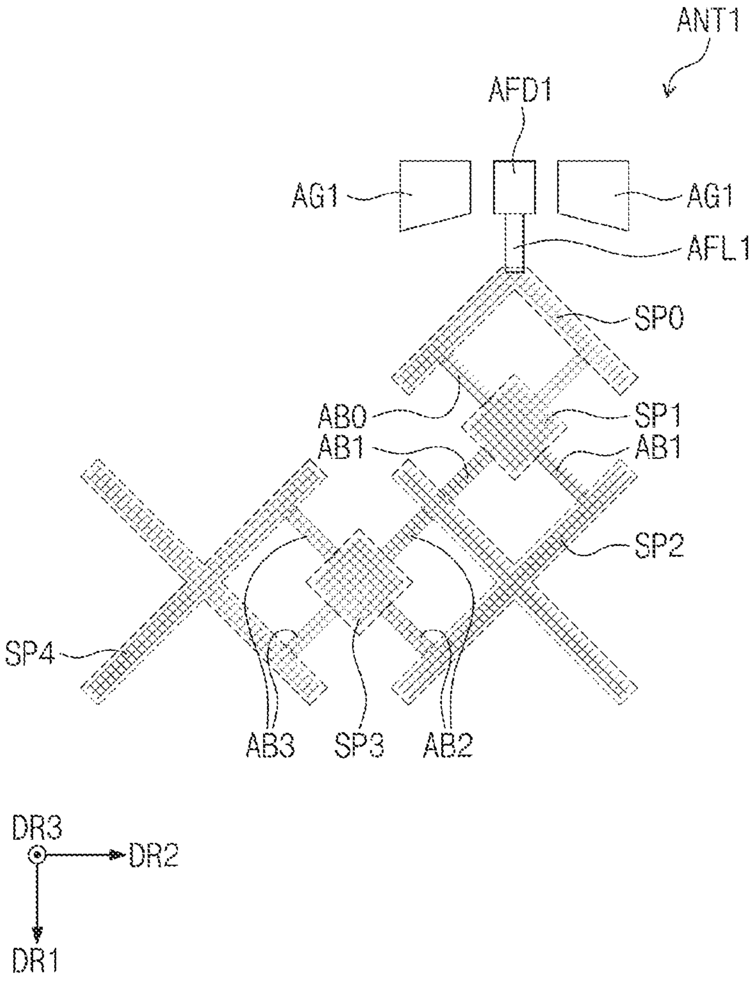
FIG. 6 is a plan view illustrating one antenna illustrated in FIG. 5.

FIG. 6 is a plan view illustrating one antenna illustrated in FIG. 5. In FIG. 6, the first antenna ANT1 is illustrated.

Referring to FIGS. 5 and 6, the first antenna pattern ANP1 may include a connecting antenna pattern SP0, a first sub-antenna pattern SP1, a second sub-antenna pattern SP2, a third sub-antenna pattern SP3, a fourth sub-antenna pattern SP4, a connecting antenna bridge pattern AB0, a first antenna bridge pattern AB1, a second antenna bridge pattern AB2, and a third antenna bridge pattern AB3. Furthermore, the first antenna pattern ANP1 may be easily expanded by additional connection of dummy patterns, for example, at least a part of first to third dummy patterns DMP1, DMP2, and DMP3 to be described below.

The connecting antenna pattern SP0 and the first sub-antenna pattern SP1 may be connected to each other, for example, by two connecting antenna bridge patterns AB0, and the first sub-antenna pattern SP1 and the second sub-antenna pattern SP2 may be connected to each other, for example, by two first antenna bridge patterns AB1. The second sub-antenna pattern SP2 and the third sub-antenna pattern SP3 may be connected to each other, for example, by two second antenna bridge patterns AB2, and the third sub-antenna pattern SP3 and the fourth sub-antenna pattern SP4 may be connected to each other, for example, by two third antenna bridge patterns AB3.

Although FIG. 6 illustrates an example that the first antenna pattern ANP1 includes the two connecting antenna bridge patterns AB0, the two first antenna bridge patterns AB1, the two second antenna bridge patterns AB2, and the two third antenna bridge patterns AB3, the first antenna pattern ANP1 may include one, two or more connecting antenna bridge patterns AB0, one, two or more first antenna bridge patterns AB1, one, two or more second antenna bridge patterns AB2, and one, two or more third antenna bridge patterns AB3.

The connecting antenna pattern SP0 may be connected to the first antenna feed line AFL1. The connecting antenna pattern SP0 may be disposed between two second sensing electrodes 220*a* and 220*a*1 adjacent to each other along the second direction DR2 and may be disposed between a first sensing electrode 210*a* and the peripheral area 200NA disposed adjacent to the first sensing electrode 210*a* along the first direction DR1. The first sensing electrode 210*a* may be a first sensing electrode disposed closest to the first antenna pad AFD1 among the plurality of first sensing electrodes 210.

The first sub-antenna pattern SP1 may be surrounded by the first sensing electrode 210*a*. For example, a plurality of openings OPS spaced apart from each other in the second direction DR2 may be defined in the first sensing electrode 210*a*, and the first sub-antenna pattern SP1 may be disposed in one opening OPS. The first dummy pattern DMP1 may be disposed in the plurality of openings OPS in which the first sub-antenna pattern SP1 is not disposed.

The first dummy pattern DMP1 may have substantially the same shape as the first sub-antenna pattern SP1. For example, the first dummy pattern DMP1 and the first sub-antenna pattern SP1 may have a rhombic shape, but the shape of the first dummy pattern DMP1 and the first sub-antenna pattern SP1 are not particularly limited thereto. For example, first dummy patterns DMP1 may be disposed in the plurality of openings OPS, respectively, and a part of the first dummy patterns DMP1 may be used as a sub-antenna pattern.

The second sub-antenna pattern SP2 may be disposed between the first sensing electrode 210*a* and the second sensing electrode 220*a*. Specifically, the second sub-antenna pattern SP2 may be disposed between the two first sensing electrodes 210*a* and 210*a*1 adjacent to each other along the first direction DR1 among the plurality of first sensing electrodes 210 and between the two second sensing electrodes 220*a* and 220*a*1 adjacent to each other along the second direction DR2 among the plurality of second sensing electrodes 220. That is, the second sub-antenna pattern SP2 may directly face the two first sensing electrodes 210*a* and 201*a*1 and the two second sensing electrodes 220*a* and 220*a*1, and be electrically insulated from the two first sensing electrodes 210*a* and 201*a*1 and the two second sensing electrodes 220*a* and 220*a*1.

In a plan view, the first sub-antenna pattern SP1 may be completely surrounded by a portion of the first sensing electrode 210*a*, and the second sub-antenna pattern SP2 may be spaced apart from the first sub-antenna pattern SP1 with a portion of the first sensing electrode 210*a* disposed therebetween.

The sensor layer 200 may further include the second dummy pattern DMP2 disposed between two first sensing electrodes 210*b* and 210*b*1 adjacent to each other among the plurality of first sensing electrodes 210 and between the two second sensing electrodes 220*a* and 220*a*1 adjacent to each other among the plurality of second sensing electrodes 220. The first sensing electrodes 210*b* and 210*b*1 are spaced apart from each other in the first direction DR1, and the second sensing electrodes 220*a* and 220*a*1 are spaced apart from each other in the second direction DR2.

The second dummy pattern DMP2 may have substantially the same shape as the second sub-antenna pattern SP2. For example, the second dummy patterns DMP2 and the second sub-antenna pattern SP2 may have the shape of "X", but the shape of second dummy patterns DMP2 are not particularly limited thereto. Furthermore, the second dummy pattern DMP2 may have a different shape from the first dummy pattern DMP1, and the second sub-antenna pattern SP2 may have a different shape from the first sub-antenna pattern SP1.

The first antenna bridge patterns AB1 may overlap the first sensing electrode 210*a* in a plan view. For example, the first antenna bridge patterns AB1 may insulatively cross the first sensing electrode 210*a* with an insulation layer disposed therebetween.

The third sub-antenna pattern SP3 may be surrounded by the second sensing electrode 220*a*. For example, a plurality of openings OPSa spaced apart from each other in the first direction DR1 may be defined in the second sensing electrode 220*a*, and the third sub-antenna pattern SP3 may be disposed in one opening OPSa. The third dummy pattern DMP3 may be disposed in the plurality of openings OPSa in which the third sub-antenna pattern SP1 is not disposed. The shapes of the third sub-antenna pattern SP3 and the third dummy pattern DMP3 may be substantially the same as the shapes of the first dummy pattern DMP1 and the first sub-antenna pattern SP1.

The fourth sub-antenna pattern SP4 may be spaced apart from the second sub-antenna pattern SP2 along the second direction DR2 with the third sub-antenna pattern SP3 disposed therebetween. For example, the fourth sub-antenna pattern SP4 may have substantially the same shape as the second sub-antenna pattern SP2.

According to an embodiment of the present disclosure, the antenna pattern ANP1 may be implemented by using the first or third dummy pattern DMP1 or DMP3 surrounded by the first sensing electrode 210 or the second sensing electrode 220 and the second dummy pattern DMP2 disposed between the first sensing electrode 210 and the second sensing electrode 220. In this case, as compared with an antenna pattern which is implemented with only the first or third dummy pattern DMP1 or DMP3 or the second dummy pattern DMP2, the density of the antenna pattern ANP1 may be increased, and thus antenna performance may be improved.

Because the first antenna pattern ANP1 includes the second dummy pattern DMP2 disposed between the first sensing electrodes 210*a* and 210*a*1 and between the second sensing electrodes 220*a* and 220*a*1 as a sub-antenna pattern, a limitation in the shape of the first antenna pattern ANP1 by the pitches or widths of the first and second sensing electrodes 210 and 220 may be reduced. Furthermore, the antenna pattern ANP1 may include both a dummy pattern surrounded by the first sensing electrode 210 and a dummy pattern surrounded by the second sensing electrode 220. Accordingly, the degree of freedom in design of the shape of the first antenna pattern ANP1 may be improved, and thus an antenna pattern having a shape optimized depending on a desired band may be provided.

In addition, the first antenna pattern ANP1 may be provided by using a part of the first to third dummy patterns DMP1, DMP2, and DMP3 included in the sensor layer 200 without a change in the gap between the first sensing electrodes 210 and the second sensing electrodes 220. Accordingly, even when the sensor layer 200 includes the first antenna pattern ANP1, the sensing performance of the sensor layer 200 may not be deteriorated.

In FIG. 6, the first antenna pattern ANP1 has been representatively described. The second antenna pattern ANP2 may include patterns having substantially the same shapes as the connecting antenna pattern SP0, the first sub-antenna pattern SP1, the second sub-antenna pattern SP2, the connecting antenna bridge pattern AB0, and the first antenna bridge pattern AB1 of the first antenna pattern ANP1, and the third antenna pattern ANP3 may include a pattern having substantially the same shape as the connecting antenna pattern SP0. That is, the second antenna pattern ANP2 and the third antenna pattern ANP3 correspond to a part of the components of the first antenna pattern ANP1, and therefore descriptions thereabout are omitted.

Figure 7A:
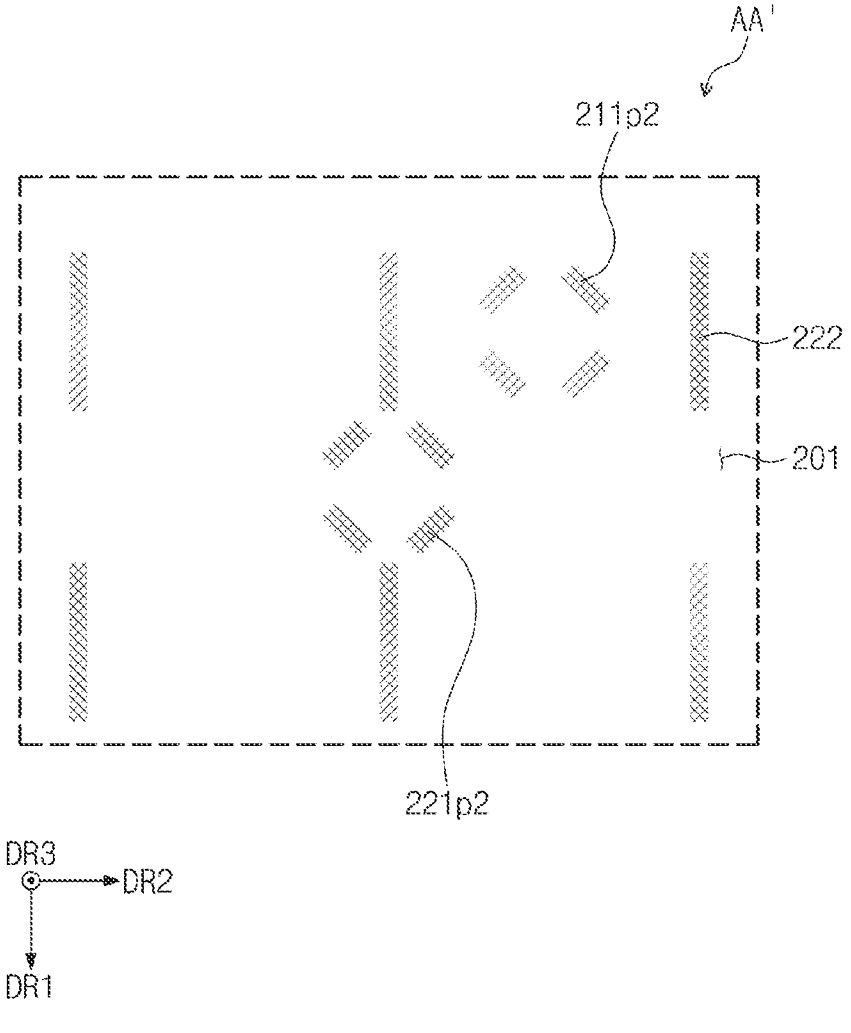
FIG. 7A is a plan view illustrating a portion of a first conductive layer according to an embodiment of the present disclosure.
Figure 7B:
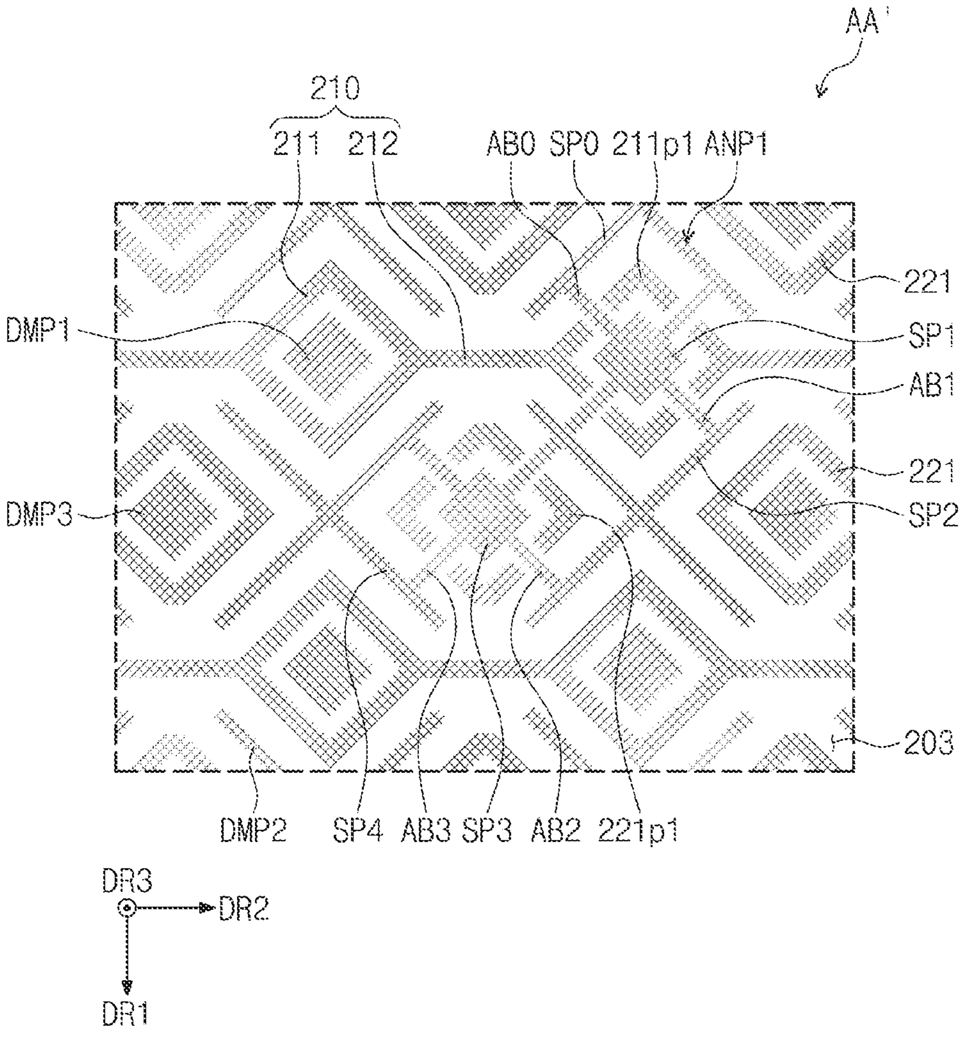
FIG. 7B is a plan view illustrating a portion of a second conductive layer according to an embodiment of the present disclosure.
Figure 7C:
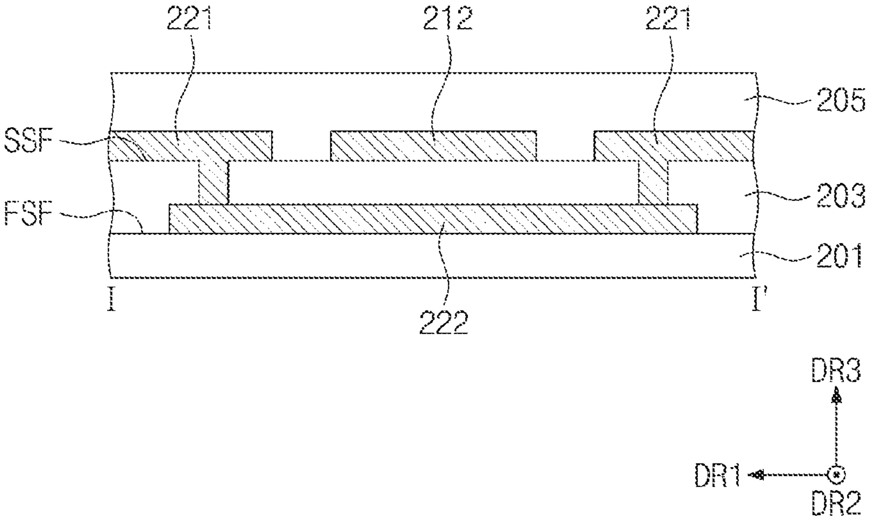
FIG. 7C is a sectional view taken along line I-I' illustrated in FIG. 5 according to an embodiment of the present disclosure.
Figure 7D:
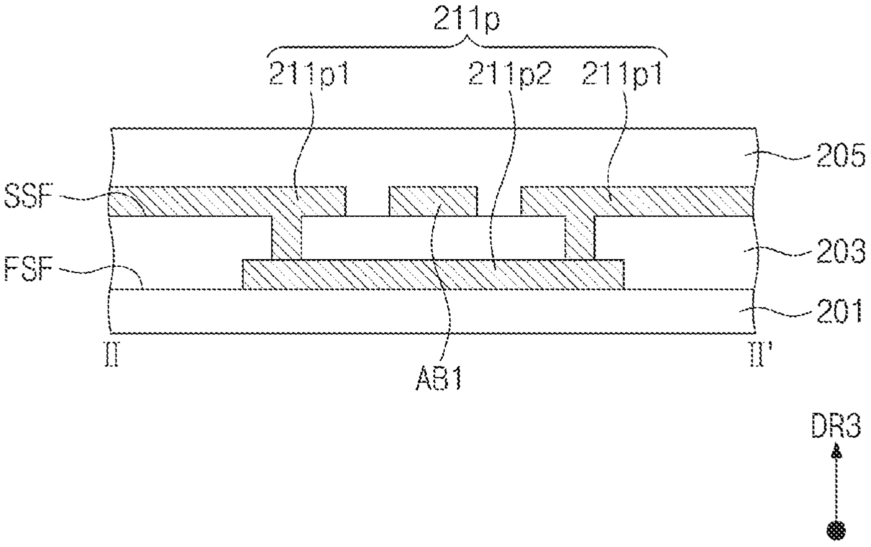
FIG. 7D is a sectional view taken along line II-II' illustrated in FIG. 5 according to an embodiment of the present disclosure.

FIG. 7A is a plan view illustrating a portion of the first conductive layer 202 (refer to FIG. 3) according to an embodiment of the present disclosure. FIG. 7B is a plan view illustrating a portion of the second conductive layer 204 (refer to FIG. 4) according to an embodiment of the present disclosure. FIG. 7C is a sectional view taken along line I-I' illustrated in FIG. 5 according to an embodiment of the present disclosure. FIG. 7D is a sectional view taken along line II-II' illustrated in FIG. 5 according to an embodiment of the present disclosure.

Referring to FIGS. 5, 7A, 7B, 7C, and 7D, a pattern portion 211*p* surrounding the first sub-antenna pattern SP1 may include first partial patterns 211*p*1 and second partial patterns 211*p*2 disposed on different layers. The sensing pattern 221 surrounding the third sub-antenna pattern SP3 may include third partial patterns 221*p*1 and fourth partial patterns 221*p*2 disposed on different layers.

The second partial patterns 211*p*2, the fourth partial patterns 221*p*2, and the bridge patterns 222 may be disposed on a first surface FSF. The first surface FSF may correspond to the upper surface of the base layer 201. That is, the second partial patterns 211*p*2 and the bridge patterns 222 may be included in the first conductive layer 202 (refer to FIG. 3).

The first antenna pattern ANP1, a portion of the first sensing electrode 210 other than the second partial patterns 211*p*2, a portion of the second sensing electrode 220 other than the fourth partial patterns 221*p*2 and the bridge patterns 222, and the first to third dummy patterns DMP1, DMP2, and DMP3 may be disposed on a second surface SSF. The second surface SSF may correspond to the upper surface of the sensing insulation layer 203. That is, the first antenna pattern ANP1, the portion of the first sensing electrode 210 other than the second partial patterns 211*p*2, the portion of the second sensing electrode 220 other than the fourth partial patterns 221*p*2 and the bridge patterns 222, and the first to third dummy patterns DMP1, DMP2, and DMP3 may be included in the second conductive layer 204 (refer to FIG. 3).

Two second partial patterns 211*p*2 may overlap and insulatively cross the two connecting antenna bridge patterns AB0, and two second partial patterns 211*p*2 may overlap and insulatively cross the two first antenna bridge patterns AB1.

Two fourth partial patterns 221*p*2 may overlap and insulatively cross the two second antenna bridge patterns AB2, and two fourth partial patterns 221*p*2 may overlap and insulatively cross the two third antenna bridge patterns AB3.

The first partial patterns 211*p*1 and the second partial patterns 211*p*2 may be electrically connected with each other. Furthermore, the third partial patterns 221*p*1 and the fourth partial patterns 221*p*2 may be electrically connected with each other. For example, the first partial patterns 211*p*1 may be brought into contact with the second partial patterns 211*p*2 through contact holes provided in the sensing insulation layer 203.

According to this embodiment, the connecting antenna pattern SP0, the first sub-antenna pattern SP1, the second sub-antenna pattern SP2, the third sub-antenna pattern SP3, the fourth sub-antenna pattern SP4, the connecting antenna bridge pattern AB0, the first antenna bridge pattern AB1, the second antenna bridge pattern AB2, and the third antenna bridge pattern AB3 that constitute the first antenna pattern ANP1 may all be disposed on the same layer.

That is, the connecting antenna bridge pattern AB0, the first antenna bridge pattern AB1, the second antenna bridge pattern AB2, and the third antenna bridge pattern AB3 may be referred to as the connecting portions. The connecting antenna bridge pattern AB0, the first antenna bridge pattern AB1, the second antenna bridge pattern AB2, and the third antenna bridge pattern AB3 may all be disposed on the same layer as the connecting antenna pattern SP0, the first sub-antenna pattern SP1, the second sub-antenna pattern SP2, the third sub-antenna pattern SP3, and the fourth sub-antenna pattern SP4 and may be provided in an integrated shape. Accordingly, the first antenna pattern ANP1 may be implemented as an integrally-connected pattern, and thus signal loss may be reduced.

Figure 8A:
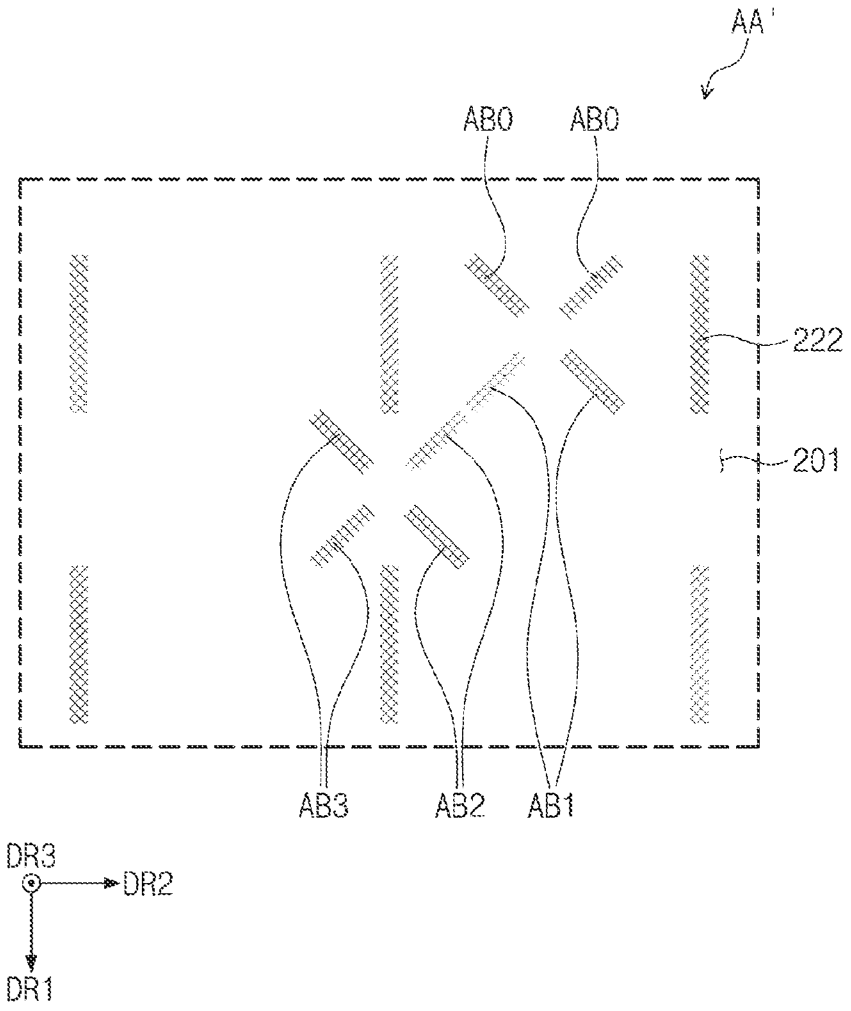
FIG. 8A is a plan view illustrating a portion of the first conductive layer according to an embodiment of the present disclosure.
Figure 8B:
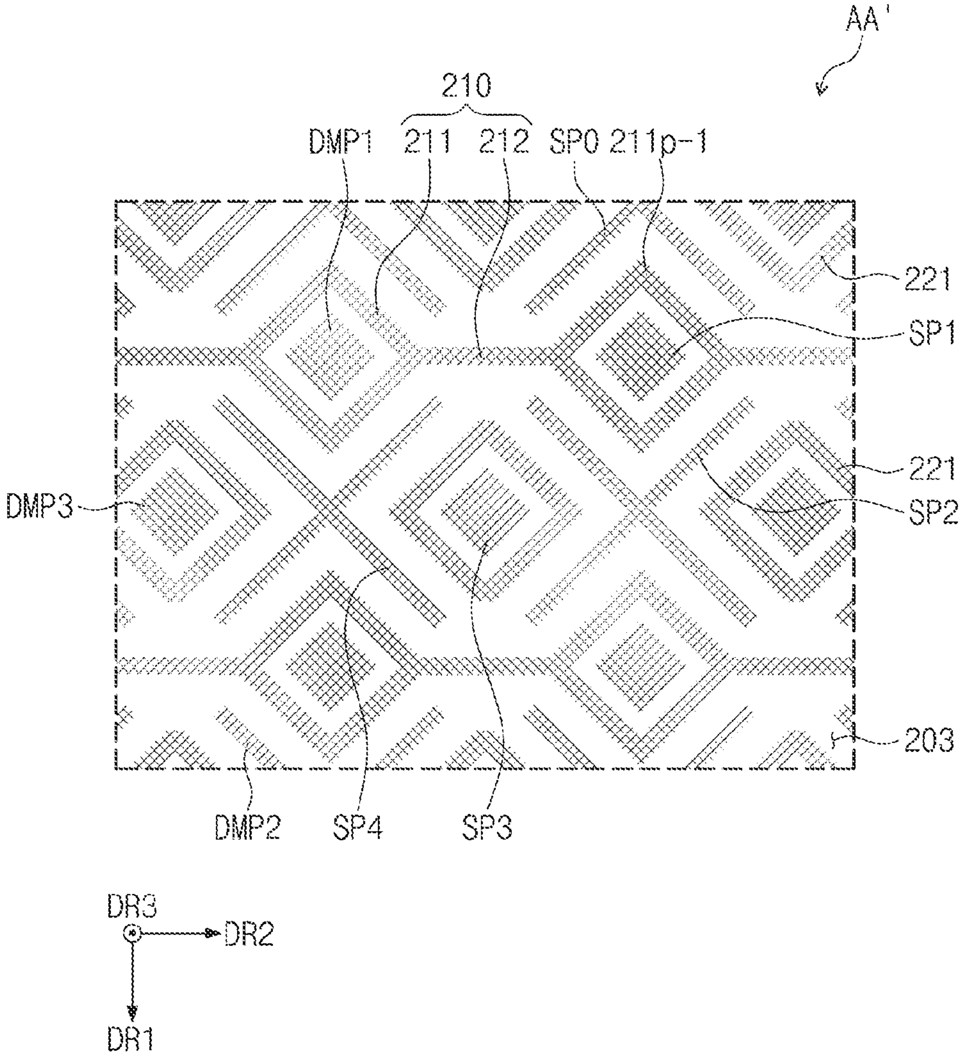
FIG. 8B is a plan view illustrating a portion of the second conductive layer according to an embodiment of the present disclosure.
Figure 8C:
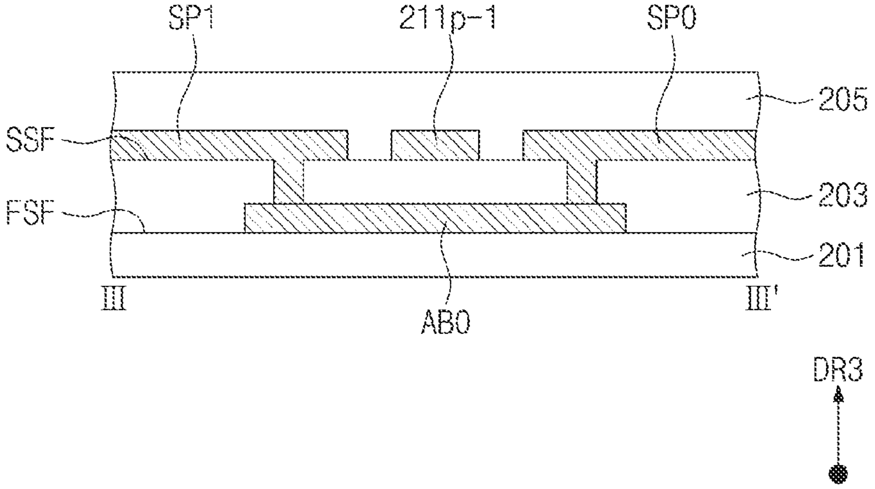
FIG. 8C is a sectional view taken along line III-III' illustrated in FIG. 5 according to an embodiment of the present disclosure.

FIG. 8A is a plan view illustrating a portion of the first conductive layer according to an embodiment of the present disclosure. FIG. 8B is a plan view illustrating a portion of the second conductive layer according to an embodiment of the present disclosure. FIG. 8C is a sectional view taken along line III-III' illustrated in FIG. 5 according to an embodiment of the present disclosure.

Referring to FIGS. 5, 8A, 8B, and 8C, the connecting antenna pattern SP0, the first sub-antenna pattern SP1, the second sub-antenna pattern SP2, the third sub-antenna pattern SP3, and the fourth sub-antenna pattern SP4 may be disposed on the same layer. The connecting antenna bridge pattern AB0, the first antenna bridge pattern AB1, the second antenna bridge pattern AB2, and the third antenna bridge pattern AB3 may be disposed on a different layer from the connecting antenna pattern SP0, the first sub-antenna pattern SP1, the second sub-antenna pattern SP2, the third sub-antenna pattern SP3, and the fourth sub-antenna pattern SP4.

For example, the connecting antenna bridge pattern AB0, the first antenna bridge pattern AB1, the second antenna bridge pattern AB2, the third antenna bridge pattern AB3, and the bridge patterns 222 may be disposed on the first surface FSF. The connecting antenna pattern SP0, the first sub-antenna pattern SP1, the second sub-antenna pattern SP2, the third sub-antenna pattern SP3, the fourth sub-antenna pattern SP4, the first sensing electrode 210, a portion of the second sensing electrode 220 other than the bridge patterns 222, and the first to third dummy patterns DMP1, DMP2, and DMP3 may be disposed on the second surface SSF.

The connecting antenna pattern SP0, the first sub-antenna pattern SP1, the second sub-antenna pattern SP2, the third sub-antenna pattern SP3, and the fourth sub-antenna pattern SP4 may be connected to one another by the connecting antenna bridge pattern AB0, the first antenna bridge pattern AB1, the second antenna bridge pattern AB2, and the third antenna bridge pattern AB3 corresponding thereto through contact holes provided in the sensing insulation layer 203.

According to this embodiment, even when the sensor layer 200 includes the first antenna pattern ANP1, the structure of the first sensing electrodes 210 and the second sensing electrodes 220 included in the sensor layer 200 is not changed. Accordingly, the sensing performance of the sensor layer 200 may not be deteriorated.

Figure 9:
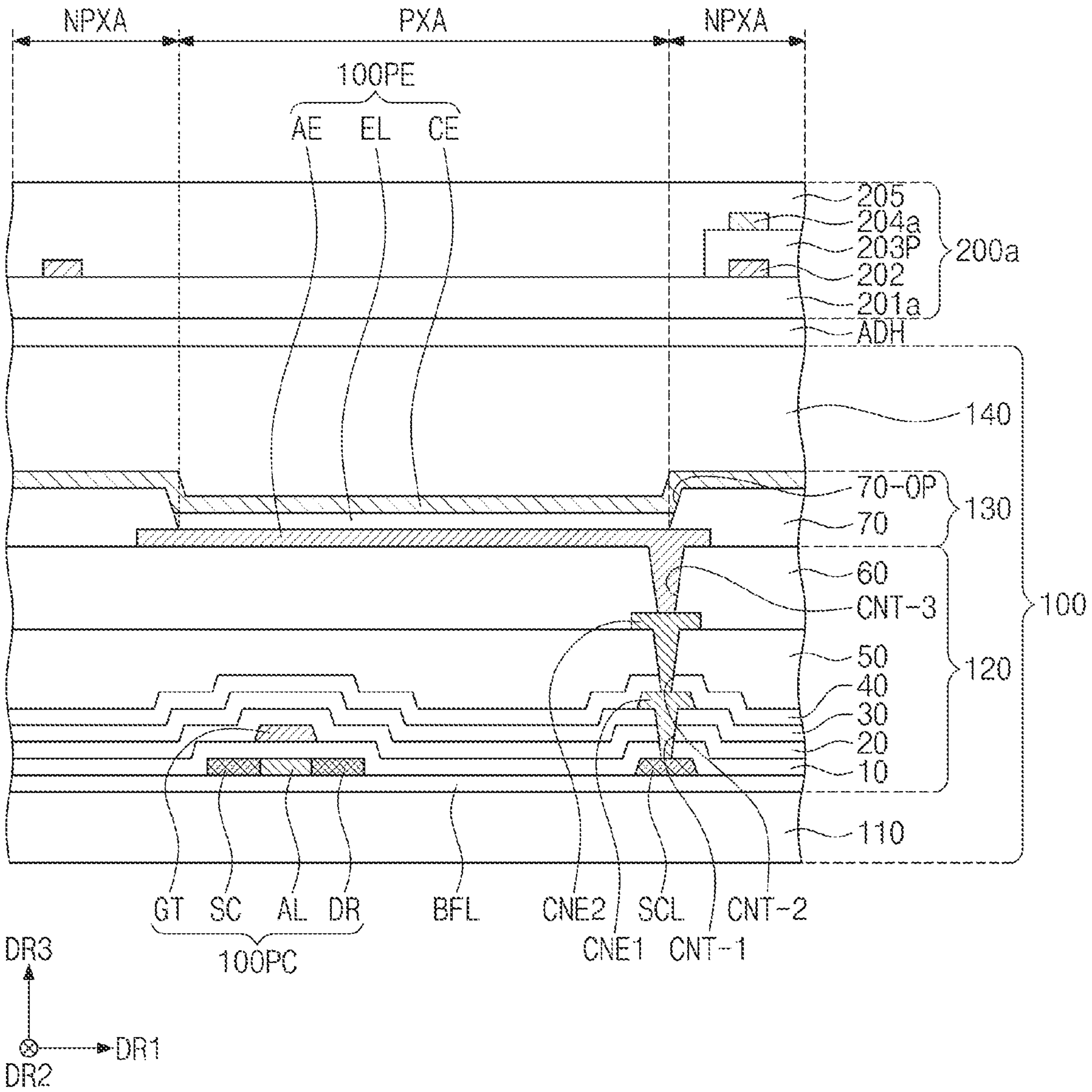
FIG. 9 is a sectional view illustrating some components of the electronic device according to an embodiment of the present disclosure.

FIG. 9 is a sectional view illustrating some components of the electronic device according to an embodiment of the present disclosure.

Referring to FIG. 9, an adhesive layer ADH may be disposed between a sensor layer 200*a* and the display layer 100. The adhesive layer ADH may be an optically clear adhesive (OCA) layer or a pressure sensitive adhesive (PSA) film, but the adhesive layer ADH is not particularly limited thereto.

The sensor layer 200*a* may include a base layer 201*a*, a first conductive layer 202, an insulating pattern 203P, a second conductive layer 204*a*, and a cover insulation layer 205.

Both the first conductive layer 202 and the second conductive laver 204*a* may be disposed over the base layer 201*a*. However, the insulating pattern 203P may be only disposed at the portion where the first conductive layer 202 and the second conductive layer 204*a* cross each other. For example, the insulating pattern 203P may be disposed over a portion of the first conductive layer 202, and a portion of the second conductive layer 204*a* may be disposed over the insulating pattern 203P. That is, the portion of the first conductive layer 202 and the portion of the second conductive layer 204*a* overlapping each other in a plan view may insulatively cross each other with the insulating pattern 203P disposed therebetween.

Figure 10:
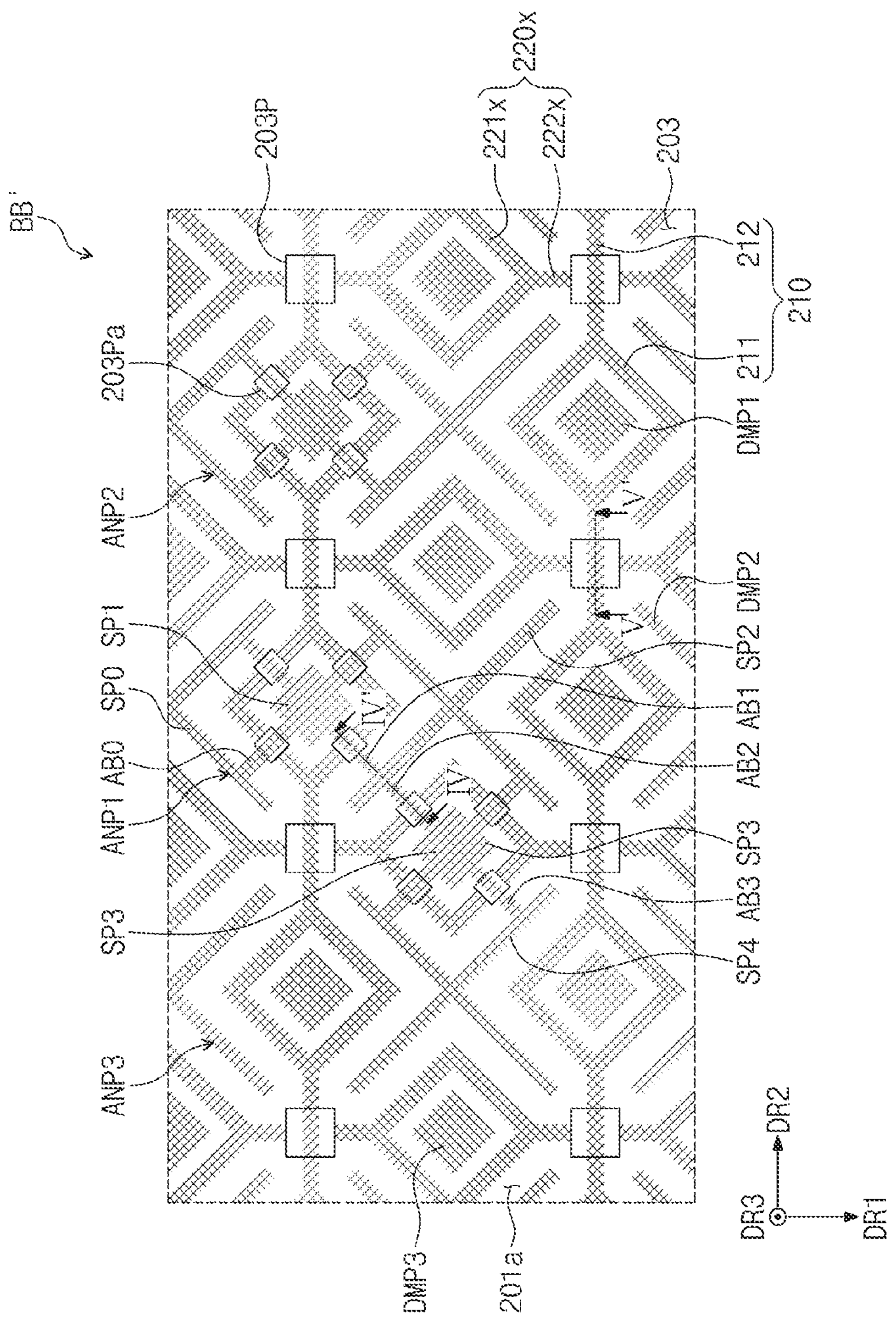
FIG. 10 is a plan view illustrating a portion of a sensor layer according to an embodiment of the present disclosure.
Figure 11A:
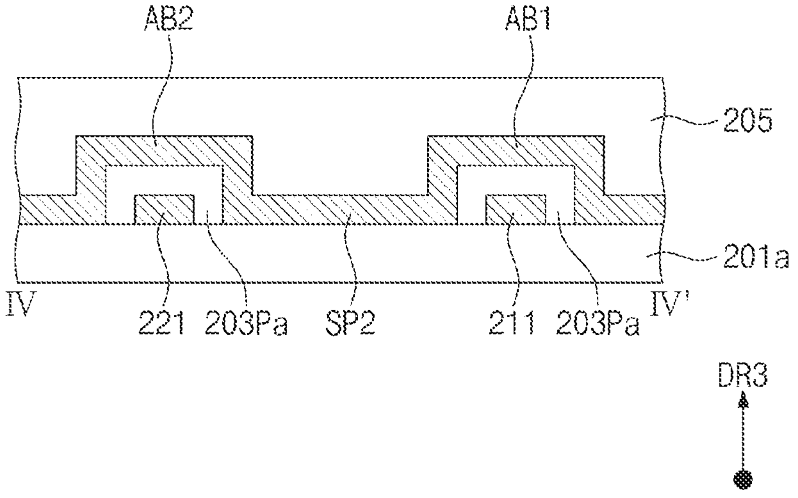
FIG. 11A is a sectional view taken along line IV-IV' of FIG. 10.
Figure 11B:
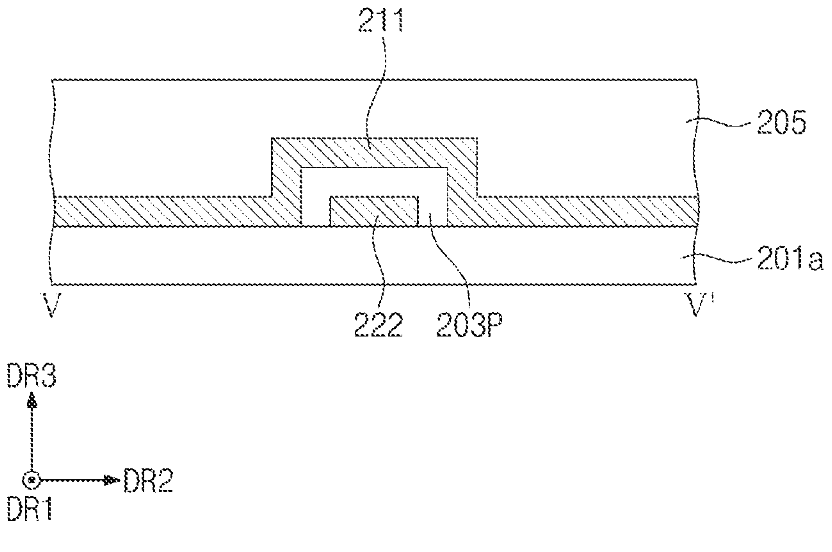
FIG. 11B is a sectional view taken along line V-V' of FIG. 10.

FIG. 10 is a plan view illustrating a portion of the sensor layer according to an embodiment of the present disclosure. FIG. 11A is a sectional view taken along line IV-IV' of FIG. 10. FIG. 11B is a sectional view taken along line V-V' of FIG. 10.

Referring to FIGS. 9, 10, 11A, and 11B, insulating patterns 203P and 203Pa are illustrated. The insulating patterns 203P and 203Pa may include the first insulating patterns 203P disposed at the portions w % here first sensing electrodes 210 and second sensing electrodes 220*x* cross each other and the second insulating patterns 203Pa disposed at the portions where first and second antenna patterns ANP1 and ANP2 cross the first sensing electrode 210 or the second sensing electrode 220*x*.

The first and second insulating patterns 203P and 203Pa may have an island shape in a plan view. For example, the first and second insulating patterns 203P and 203Pa may be isolated and may be spaced apart from each other. That is, the first and second insulating patterns 203P and 203Pa may be partially disposed only at portions in which conductive patterns cross each other to prevent a short circuit between the conductive patterns.

Each of the second sensing electrodes 220*x* may include a plurality of pattern portions 221*x* spaced apart from each other in the first direction DR1 and connecting portions 222*x*, each of which connects two pattern portions 221*x* adjacent to each other among the plurality of pattern portions 221*x*. The plurality of pattern portions 221*x* and the plurality of connecting portions 222*x* may be connected together to form an integrated shape. The first insulating patterns 203P may be disposed between the connecting portions 222*x* and connecting portions 212 of the first sensing electrodes 210, and the connecting portions 222*x* may insulatively cross the connecting portions 212.

The second insulating patterns 203Pa may be disposed at the portions where the first and second antenna patterns ANP1 and ANP2 cross the first sensing electrode 210 or the second sensing electrode 220*x*. Accordingly, sub-patterns constituting each of the first and second antenna patterns ANP1 and ANP2 may be implemented as an integrally-connected pattern. As each of the first antenna pattern ANP1 and the second antenna pattern ANP2 is implemented as an integrally-connected pattern, signal loss may be reduced.

Furthermore, even when the sensor layer 200*a* includes the first to third antenna patterns ANP1, ANP2, and ANP3, the structure of the first sensing electrodes 210 and the second sensing electrodes 220*x* included in the sensor layer 200*a* is not changed. Accordingly, the sensing performance of the sensor layer 200*a* may not be deteriorated.

Figure 12:
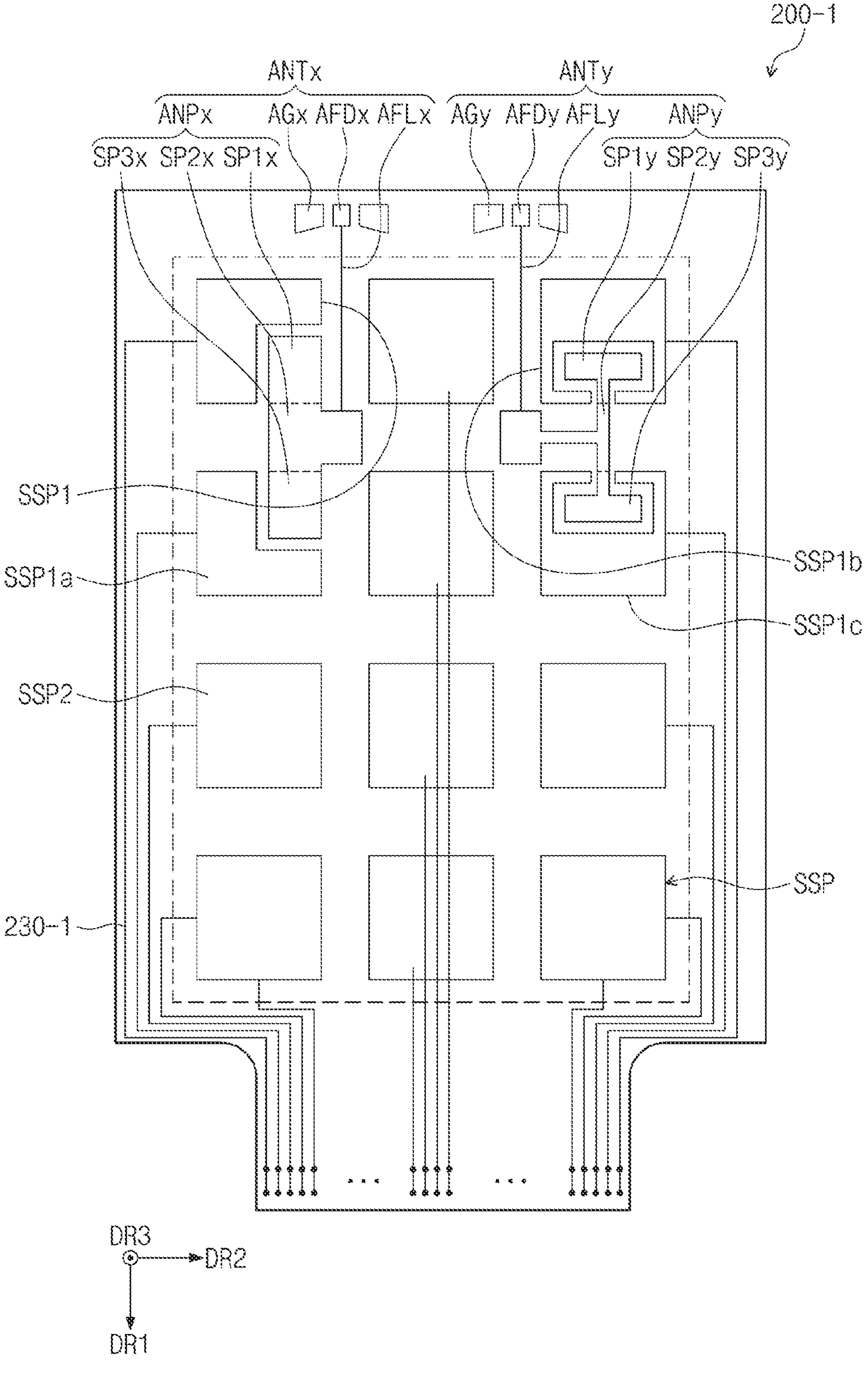
FIG. 12 is a plan view of a sensor layer according to an embodiment of the present disclosure.

FIG. 12 is a plan view of a sensor layer 200-1 according to an embodiment of the present disclosure.

Referring to FIG. 12, the sensor layer 200-1 may include a plurality of sensing areas arranged in a first direction and a second direction crossing the first direction, a plurality of sensing patterns SSP disposed in the plurality of sensing areas, respectively, trace lines 230-1, a first antenna ANTx, and a second antenna ANTy.

Although a total of 12 sensing patterns SSP are illustrated in FIG. 12, the number of sensing patterns SSP included in the sensor layer 200-1 is not limited thereto. The trace lines 230-1 may be connected to the sensing patterns SSP, respectively.

Furthermore, the number and shape of antennas included in the sensor layer 200-1 are not limited to the example illustrated in FIG. 12. The first antenna ANTx and the second antenna ANTy may have different shapes and may transmit, receive, or transmit/receive signals in different frequency bands. However, this is illustrative, and the first antenna ANTx and the second antenna ANTy may have the same shape or may have shapes symmetrical to each other and may transmit, receive, or transmit/receive signals in the same frequency band.

The first antenna ANTx may include a first antenna pattern ANPx, a first antenna feed line AFLx, a first antenna pad AFDx, and a first antenna ground pad AGx. The first antenna pattern ANPx, the first antenna feed line AFLx, and the first antenna pad AFDx may be electrically connected together. The first antenna pattern ANPx may include a first sub-antenna pattern SP1x, a second sub-antenna pattern SP2x, and a third sub-antenna pattern SP3x electrically connected together.

The second antenna ANTy may include a second antenna pattern ANPy, a second antenna feed line AFLy, a second antenna pad AFDy, and a second antenna ground pad AGy. The second antenna pattern ANPy, the second antenna feed line AFLy, and the second antenna pad AFDy may be electrically connected together. The second antenna pattern ANPy may include a fourth sub-antenna pattern SP1y, a fifth sub-antenna pattern SP2y, and a sixth sub-antenna pattern SP3y.

The sensing patterns SSP may include first sensing patterns SSP1, SSP1a, SSP1b, and SSP1c and second sensing patterns SSP2. The area of each of the second sensing patterns SSP2 may be larger than the areas of the first sensing patterns SSP1, SSP1a, SSP1b, and SSP1c.

At least a portion of the first sub-antenna pattern SP1x may be surrounded by the first sensing pattern SSP1. At least a portion of the third sub-antenna pattern SP3x may be surrounded by the first sensing pattern SSP1a. At least a portion of the fourth sub-antenna pattern SP1y may be surrounded by the first sensing pattern SSP1b, and at least a portion of the sixth sub-antenna pattern SP3y may be surrounded by the first sensing pattern SSP1c. Each of the first, third, fourth, and sixth sub-antenna patterns SP1x, SP3x, SP1y, and SP3y may be disposed in a respective sensing area correspond to a portion of the sensing area in which the first sensing pattern SSP1, SSP1a, SSP1b or SSP1c is removed.

The second sub-antenna pattern SP2x may be disposed in an area between the sensing patterns SSP. The shapes of the sensing areas may correspond to the shapes of the second sensing patterns SSP2. One first sensing pattern and a first portion of an antenna pattern may be disposed in one sensing areas. Another portion of the antenna pattern may be disposed in a dummy area which is disposed between the plurality of sensing areas. For example, the one portion of the antenna pattern disposed in the sensing area may be one of the first, third, fourth, and sixth sub-antenna patterns SP1x, SP3x, SP1y, and SP3y, and the other portion of the antenna pattern disposed in the dummy area may be one of the second and fifth sub-antenna patterns SP2x and SP2y.

According to an embodiment of the present disclosure, the areas of the first sensing patterns SSP1, SSP1a. SSP1b, and SSP1c are smaller than the areas of the second sensing patterns SSP2. Accordingly, the sensitivities in the node areas where the first sensing patterns SSP1. SSP1a, SSP1b, and SSP1c are disposed may be lower than the sensitivities in the node areas where the second sensing patterns SSP2 are disposed. Accordingly, to compensate for the sensitivities, gains applied to sensing signals received from the first sensing patterns SSP1, SSP1a, SSP1b, and SSP1c may be higher than gains applied to sensing signals received from the second sensing patterns SSP2.

According to the embodiments of the present disclosure, one antenna pattern may be implemented by using the first dummy pattern surrounded by the first sensing electrode or the second sensing electrode and the second dummy pattern disposed between the first sensing electrode and the second sensing electrode. In this case, the density of the antenna pattern may be increased, and thus antenna performance may be improved as compared with when an antenna pattern is implemented by using only the first dummy pattern.

Because the one antenna pattern includes the second dummy pattern, a limitation in the shape of the antenna pattern by the pitches or widths of the first and second sensing electrodes may be reduced. Furthermore, the one antenna pattern may include both the dummy pattern surrounded by the first sensing electrode and the dummy pattern surrounded by the second sensing electrode. Accordingly, the degree of freedom in design of the shape of the antenna pattern may be improved, and thus an antenna pattern having a shape optimized depending on a desired band may be provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising:

a plurality of first sensing electrodes arranged in a first direction;

a plurality of second sensing electrodes arranged in a second direction crossing the first direction; and an antenna pattern including a first sub-antenna pattern surrounded by one of the plurality of first sensing electrodes and a second sub-antenna pattern electrically connected to the first sub-antenna pattern and disposed between the one of the plurality of first sensing electrodes and one of the plurality of second sensing electrodes.

2. The electronic device of claim 1, wherein the antenna pattern further includes an antenna bridge pattern connecting the first sub-antenna pattern and the second sub-antenna pattern, and wherein the antenna bridge pattern overlaps the one of the plurality of first sensing electrodes in a plan view.

3. The electronic device of claim 2, wherein the first sub-antenna pattern, the second sub-antenna pattern, and the antenna bridge pattern are disposed on a same laver and connected together to form an integrated shape.

4. The electronic device of claim 3, wherein the one of the plurality of first sensing electrodes includes a pattern portion surrounding the first sub-antenna pattern, and wherein the pattern portion includes a first partial pattern disposed on the same layer as the first sub-antenna pattern, the second sub-antenna pattern, and the antenna bridge pattern and a second partial pattern disposed on a different layer from the first partial pattern and crossing the antenna bridge pattern.

5. The electronic device of claim 4, wherein the antenna bridge pattern includes a plurality of antenna bridge patterns, and the second partial pattern includes a plurality of second partial patterns.

6. The electronic device of claim 2, wherein the antenna bridge pattern is disposed on a first layer, and the first sub-antenna pattern and the second sub-antenna pattern are disposed on a second layer disposed over the first layer.

7. The electronic device of claim 2, further comprising:

an insulating layer disposed between the antenna bridge pattern and the one of the plurality of first sensing electrodes.

8. The electronic device of claim 2, further comprising:

an insulating pattern having an island shape, the insulating pattern being disposed between the antenna bridge pattern and the one of the plurality of first sensing electrodes.

9. The electronic device of claim 1, wherein the antenna pattern further includes a third sub-antenna pattern surrounded by the one of the plurality of second sensing electrodes and is electrically connected to the first sub-antenna pattern and the second sub-antenna pattern.

10. The electronic device of claim 9, wherein the second sub-antenna pattern is connected to the first sub-antenna pattern through a first antenna bridge pattern overlapping the one of the plurality of first sensing electrodes, and wherein the second sub-antenna pattern is connected to the third sub-antenna pattern through a second antenna bridge pattern overlapping the one of the plurality of second sensing electrodes.

11. The electronic device of claim 1, further comprising:

an antenna feed line electrically connected to the antenna pattern; and an antenna pad connected to the antenna feed line, wherein the antenna pattern further includes a connecting antenna pattern disposed between the one of the plurality of first sensing electrodes and the antenna feed line and connected to the antenna feed line.

12. The electronic device of claim 1, further comprising:

a first dummy pattern surrounded by the one of the plurality of first sensing electrodes and spaced apart from the first sub-antenna pattern, wherein the first dummy pattern has substantially a same shape as a shape of the first sub-antenna pattern.

13. The electronic device of claim 12, wherein the one of the plurality of first sensing electrodes includes a plurality of pattern portions arranged to be spaced apart from each other in the second direction and a plurality of connecting portions, each of which connects two pattern portions adjacent to each other, wherein the first sub-antenna pattern is surrounded by one of the plurality of pattern portions, and wherein the first dummy pattern is surrounded by another one of the plurality of pattern portions.

14. The electronic device of claim 1, further comprising:

a second dummy pattern disposed between another first sensing electrode spaced apart from the one of the plurality of first sensing electrodes in the first direction and the one of the plurality of second sensing electrodes, wherein the second dummy pattern has substantially the same shape as the second sub-antenna pattern.

15. The electronic device of claim 14, wherein the second sub-antenna pattern is disposed between two first sensing electrodes adjacent to each other and between two second sensing electrodes adjacent to each other, and wherein the second dummy pattern is disposed between two other first sensing electrodes adjacent to each other and between the two second sensing electrodes.

16. The electronic device of claim 1, wherein the first sub-antenna pattern and the second sub-antenna pattern have different shapes.

17. An electronic device comprising:

a plurality of sensing patterns arranged in a first direction and a second direction crossing the first direction;

a first sub-antenna pattern at least partially surrounded by a first sensing pattern among the plurality of sensing patterns;

a second sub-antenna pattern connected to the first sub-antenna pattern and disposed between the plurality of sensing patterns;

an antenna feed line electrically connected to the first sub-antenna pattern and the second sub-antenna pattern; and an antenna pad connected to the antenna feed line.

18. The electronic device of claim 17, wherein the first sensing pattern has a smaller area than a second sensing pattern spaced apart from the first sub-antenna pattern.

19. The electronic device of claim 18, wherein the first sub-antenna pattern is disposed in an area corresponds to a portion of the first sensing area in which the first sensing pattern is removed.

20. The electronic device of claim 18, further comprising:

a third sub-antenna pattern connected to the second sub-antenna pattern and at least partially surrounded by a third sensing pattern spaced apart from the first sub-antenna pattern.

21. The electronic device of claim 17, wherein the first sub-antenna pattern is completely surrounded by the first sensing pattern and spaced apart from the second sub-antenna pattern with the first sensing pattern therebetween.

22. The electronic device of claim 21, further comprising:

an antenna bridge pattern connected to the first sub-antenna pattern and the second sub-antenna pattern, wherein the antenna bridge pattern overlaps the first sensing pattern when viewed on a plane.

23. The electronic device of claim 22, wherein the first sub-antenna pattern, the second sub-antenna pattern, and the antenna bridge pattern are disposed on a same layer and connected together to form an integrated shape.

24. The electronic device of claim 22, wherein the first sensing pattern includes a first partial pattern disposed on a same layer as the first sub-antenna pattern, the second sub-antenna pattern, and the antenna bridge pattern and a second partial pattern disposed on a different layer from the first partial pattern and configured to cross the antenna bridge pattern.

* * * * *